United States Patent
Kim et al.

(10) Patent No.: US 9,936,506 B2
(45) Date of Patent: Apr. 3, 2018

(54) METHOD FOR RECEIVING OR TRANSMITTING UPLINK SIGNAL IN WIRELESS COMMUNICATION SYSTEM AND APPARATUS THEREFOR

(71) Applicant: LG ELECTRONICS INC., Seoul (KR)

(72) Inventors: Bonghoe Kim, Seoul (KR); Suckchel Yang, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/327,624

(22) PCT Filed: May 9, 2016

(86) PCT No.: PCT/KR2016/004824
§ 371 (c)(1),
(2) Date: Jan. 19, 2017

(87) PCT Pub. No.: WO2016/182291
PCT Pub. Date: Nov. 17, 2016

(65) Prior Publication Data
US 2017/0208590 A1    Jul. 20, 2017

Related U.S. Application Data

(60) Provisional application No. 62/158,556, filed on May 8, 2015.

(51) Int. Cl.
*H04W 72/04* (2009.01)
*H04W 4/00* (2018.01)
*H04W 72/10* (2009.01)

(52) U.S. Cl.
CPC ....... *H04W 72/0453* (2013.01); *H04W 4/005* (2013.01); *H04W 72/0446* (2013.01); *H04W 72/10* (2013.01)

(58) Field of Classification Search
CPC ............. H04W 72/0453; H04W 72/10; H04W 72/0446; H04W 4/005
See application file for complete search history.

(56) References Cited

U.S. PATENT DOCUMENTS

2011/0085457 A1* 4/2011 Chen ............... H04L 1/1812
370/252
2013/0322363 A1* 12/2013 Chen ............... H04W 72/042
370/329

(Continued)

FOREIGN PATENT DOCUMENTS

| WO | 2014111695 | 7/2014 |
| WO | 2014111727 | 7/2014 |
| WO | 2015148997 | 10/2015 |

OTHER PUBLICATIONS

PCT International Application No. PCT/KR2016/004824, Written Opinion of the International Searching Authority dated Aug. 8, 2016, 21 pages.

(Continued)

*Primary Examiner* — Mohammad S Anwar
(74) *Attorney, Agent, or Firm* — Lee, Hong, Degerman, Kang & Waimey PC

(57) ABSTRACT

According to an embodiment of the present invention, an MTC UE performs frequency retuning in order to perform uplink transmission through different subbands in consecutive first and second subframes, wherein positions of symbols, used for frequency retuning within the range of last n symbols of the first subframe to first n symbols of the second (Continued)

subframe, are determined according to priority between uplink signals to be transmitted.

15 Claims, 12 Drawing Sheets

(56) References Cited

U.S. PATENT DOCUMENTS

| | | |
|---|---|---|
| 2015/0016377 A1 | 1/2015 | Kim et al. |
| 2015/0036566 A1 | 2/2015 | Blankenship et al. |
| 2015/0036601 A1 | 2/2015 | Kim et al. |
| 2016/0094996 A1* | 3/2016 | Xiong .................. H04L 1/16 370/329 |
| 2016/0226639 A1* | 8/2016 | Xiong .................. H04L 5/0053 |

OTHER PUBLICATIONS

LG Electronics, "Discussions on frequency hopping and subband for Rel-13 MTC UEs", R1-151486, 3GPP TSG RAN WG1 Meeting #80bis, Apr. 2015, 5 pages.
ZTE "Consideration on physical uplink control channel for MTC enhancement", R1-151731, 3GPP TSG RAN WG1 Meeting #80bis, Apr. 2015, 6 pages.
Ericsson, "PUCCH transmission for MTC", R1-151217, 3GPP TSG RAN WG1 Meeting #80b, Apr. 2015, 4 pages.
Samsung, "UL Retuning", R1-160541, 3GPP TSG RAN WG1 #84, Feb. 2016, 3 pages.
Ericsson, "UL retuning gaps for MTC", R1-157472, 3GPP TSG RAN WG1 Meeting #83, Nov. 2015, 6 pages.
Huawei, HiSilicon, "PUCCH and UCI for MTC and coverage enhancement", R1-151267, 3GPP TSG RAN WG1 Meeting #80bis, Apr. 2015, 5 pages.
ASUSTeK, "Power control for multiple timing advances", R1-123711, 3GPP TSG RAN WG1 Meeting #70, Aug. 2012, 2 pages.

* cited by examiner

FIG. 2
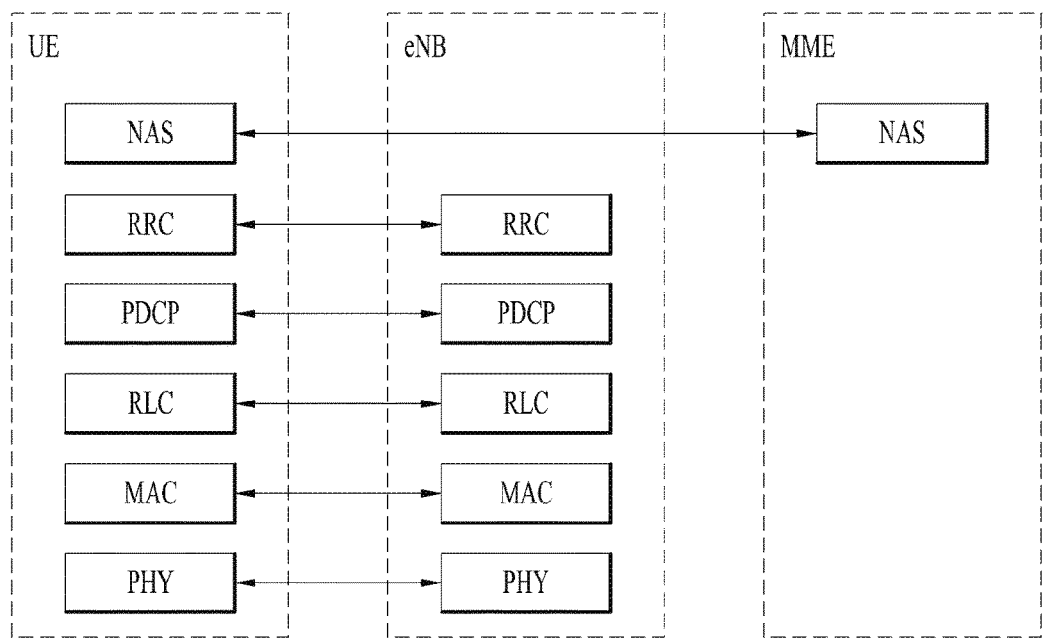
(a) Control-Plane Protocol Stack
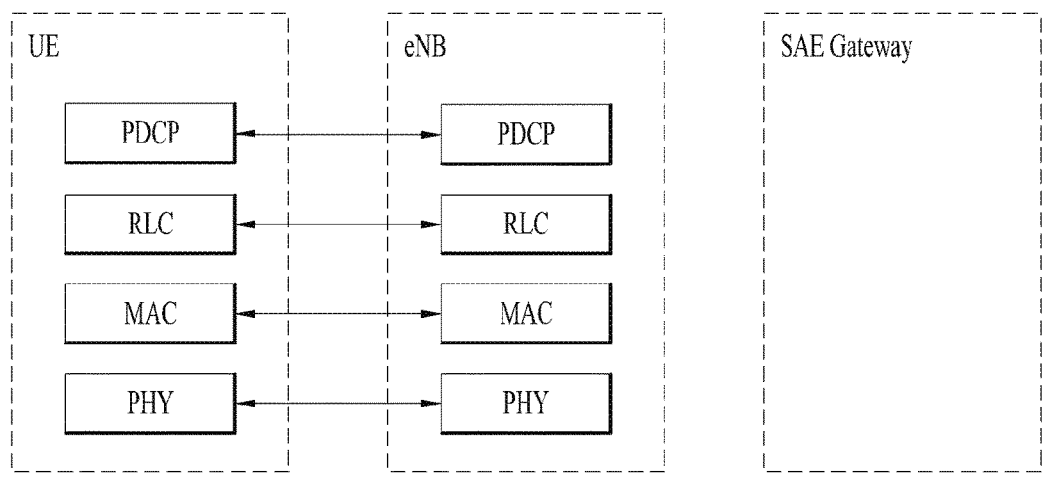
(b) User-Plane Protocol Stack Number of hypotheses of resource allocation = $N_{RB}(N_{RB}+1)/2$
Required number for hypotheses = ceiling( $\log_2(N_{RB}(N_{RB}+1)/2)$ )

METHOD FOR RECEIVING OR TRANSMITTING UPLINK SIGNAL IN WIRELESS COMMUNICATION SYSTEM AND APPARATUS THEREFOR

TECHNICAL FIELD

The present invention relates to a wireless communication system and, more specifically, to a method for transmitting or receiving an uplink machine type communication (MTC) signal in a wireless communication system supporting MTC and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE

Technical Problem

An object of the present invention devised to solve the problem lies in a method of transmitting, by an MTC UE, uplink signals through different subbands by performing frequency retuning and an apparatus therefor.

Other technical features of the present invention may be derived from the following detailed description.

Technical Solution

In an aspect of the present invention, a method of transmitting an uplink signal by a machine type communication (MTC) UE in a wireless communication system includes: transmitting a first uplink signal through a first subband in a first subframe; retuning a frequency of the MTC UE from the first subband to a second subband; and transmitting a second uplink signal through the second subband in a second subframe, wherein, when the first subframe and the second subframe are consecutive in the retuning of the frequency, the MTC UE performs frequency retuning instead of transmission of the first uplink signal or the second uplink signal in at least parts of last n symbols of the first subframe and first n symbols of the second subframe, wherein positions of at least parts of the symbols, used for frequency retuning within the range of the last n symbols of the first subframe to the first n symbols of the second subframe, are determined according to priority predetermined between the first uplink signal and the second uplink signal.

In another aspect of the present invention, an MTC UE includes: a transmitter for transmitting a first uplink signal through a first subband in a first subframe and transmitting a second uplink signal through a second subband in a second subframe; and a processor configured to retune a frequency of the MTC UE from the first subband to the second subband, wherein, when the first subframe and the second subframe are consecutive, the processor is configured to perform frequency retuning instead of transmission of the first uplink signal or the second uplink signal in at least parts of last n symbols of the first subframe and first n symbols of the second subframe, wherein positions of at least parts of the symbols, used for frequency retuning within the range of the last n symbols of the first subframe to the first n symbols of the second subframe, are determined according to priority predetermined between the first uplink signal and the second uplink signal.

Frequency retuning may be performed in the first n symbols of the second subframe when the first uplink signal is prioritized over the second uplink signal and performed in the last n symbols of the first subframe when the second uplink signal is prioritized over the first uplink signal.

When the first uplink signal and the second uplink signal have the same priority, symbols in which frequency retuning is performed may be equally distributed in the first subframe and the second subframe.

When the first uplink signal includes a sounding reference signal (SRS) and the second uplink signal includes a physical uplink control channel (PUCCH) or a physical uplink shared channel (PUSCH), symbols in which frequency retuning is performed may include the last symbol of the first subframe and transmission of the SRS may be dropped.

Symbols in which frequency retuning is performed may be set to the first n symbols of the second subframe when the first uplink signal is a PUCCH and the second uplink signal is a PUSCH and set to the last n symbols of the first subframe when the first uplink signal is a PUSCH and the second uplink signal is a PUCCH.

When an SRS is set to the same subframe as a PUCCH or a PUSCH and a subband of the SRS differs from a subband of the PUCCH or the PUSCH, transmission of the SRS may be dropped.

A PUCCH may be prioritized over a PUSCH and the PUSCH may be prioritized over an SRS according to the predetermined priority.

The MTC UE may receive a radio resource control (RRC) configuration about a subband in which a PUSCH is transmitted, wherein the subband in which the PUSCH is transmitted is frequency-hopped on the basis of the RRC configuration.

Frequency retuning may be performed in the first n symbols of the second subframe when the first uplink signal includes a physical random access channel (PRACH) and performed in the last n symbols of the first subframe when the second uplink signal includes the PRACH.

Advantageous Effects

According to an embodiment of the present invention, an MTC UE determines symbols necessary for frequency retuning according to priority when performing frequency retuning in order to transmit uplink signals through different subbands, and thus the uplink signals can be transmitted more efficiently and accurately.

Effects obtainable from the present invention are non-limited by the above mentioned effect. And, other unmentioned effects can be clearly understood from the following description by those having ordinary skill in the technical field to which the present invention pertains

DESCRIPTION OF DRAWINGS

FIG. 2 is a diagram illustrating structures of a control plane and a user plane of a radio interface protocol between a UE and an E-UTRAN based on the 3GPP radio access network specification.

BEST MODE

Figure 1:
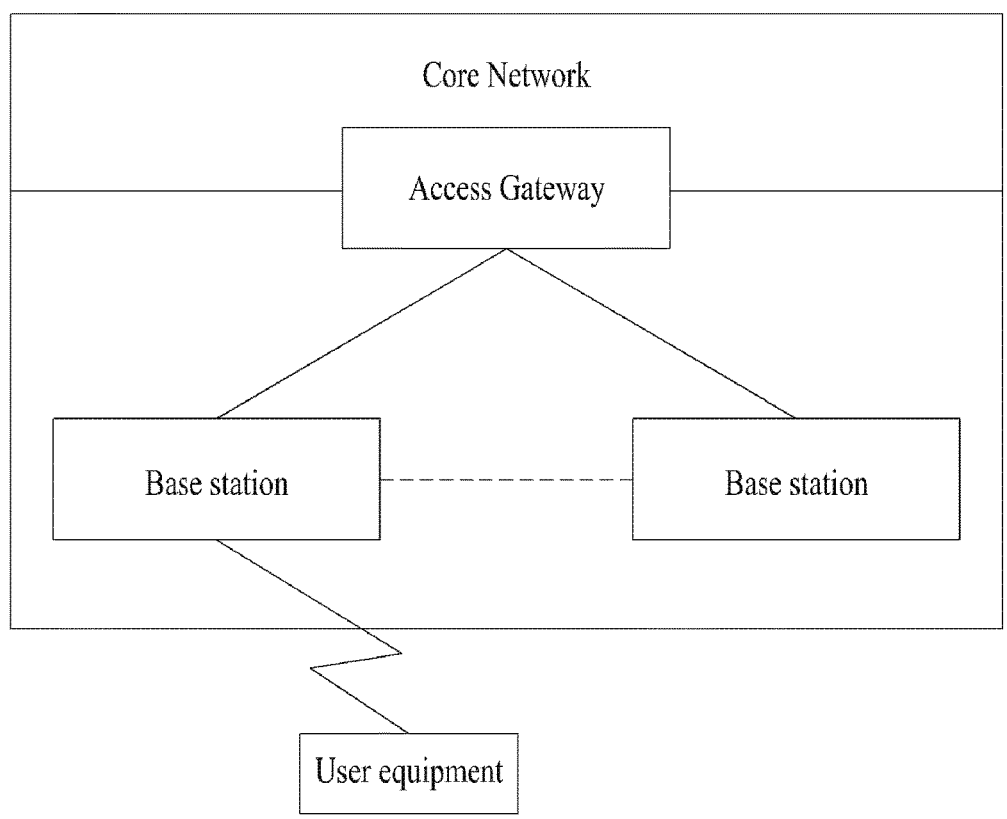
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications. In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers.

A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constituting an eNB is set to one of the bandwidths of 1.44, 3, 5, 10, 15 and 20 Mhz and provides DL or UL transmission service to a plurality of UEs in the bandwidth. Different cells may be configured so as to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
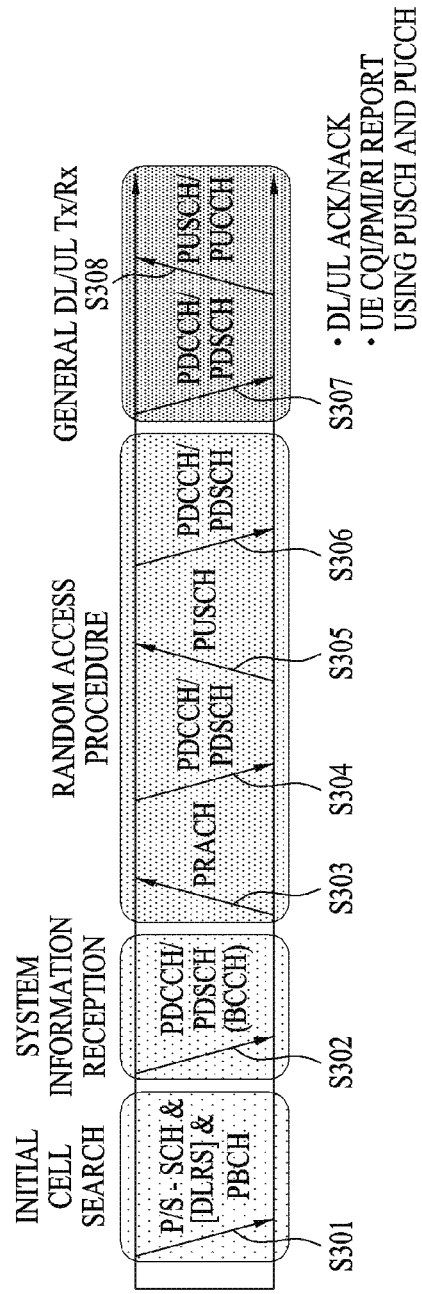
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

In a cellular OFDM wireless packet communication system, uplink/downlink data packet transmission is performed on a subframe-by-subframe basis, and one subframe is defined as a predetermined period including a plurality of OFDM symbols.

The present invention defines the following terms for technical convenience. (i) RE (Resource Element): the smallest frequency-time unit to which data or modulated symbols of control channels are mapped. If a signal is transmitted in one OFDM symbol through M subcarriers and N OFDM symbols are transmitted in one subframe, M×N REs are present in one subframe. (ii) PRB (Physical Resource Block): A unit frequency-time resource carrying data. One PRB is composed of consecutive REs in the frequency-time domain and a plurality of PRBs is defined within one subframe. (iii) VRB (Virtual Resource Block): A virtual unit resource for data transmission. In general, the number of REs included in one VRB equals the number of REs included in one PRB, and one VRB can be mapped to one PRB or part of a plurality of PRBs in actual data transmission. (iv) LVRB (Localized Virtual Resource Block): One type of VRB. One LVRB is mapped to one PRB and PRBs to which different LVRBs are mapped do not overlap. The LVRB may be interpreted as a PRB. (v) DVRB (Distributed Virtual Resource Block): One type of VRB. One DVRB is mapped to some REs within a plurality of PRBs and REs mapped to different DVRBs do not overlap. (vi) $N_{PRB}$: the number of PRBs of a system. (vii) $N_{LVRB}$: the number of LVRBs that can be used in a system. (viii) $N_{DVRB}$: the number of DVRBs that can be used in a system. (ix) $N_{LVRBD\_UE}$: a maximum number of LVRBs allocated per UE. (x) $N_{DVRB\_UE}$: a maximum number of DVRBs allocated per UE. (xi) $N_{subset}$: the number of subsets.

In 3GPP LTE, one RB is composed of 12 subcarriers and OFDM symbols constituting one slot. That is, one slot includes 7 OFDM symbols when a normal CP (Cyclic Prefix) is used and thus 12×7 REs constitute one RB. RBs of the first slot and RBs of the second slots of one subframe are paired (RB-pair) and allocated to a UE.

Figure 4:
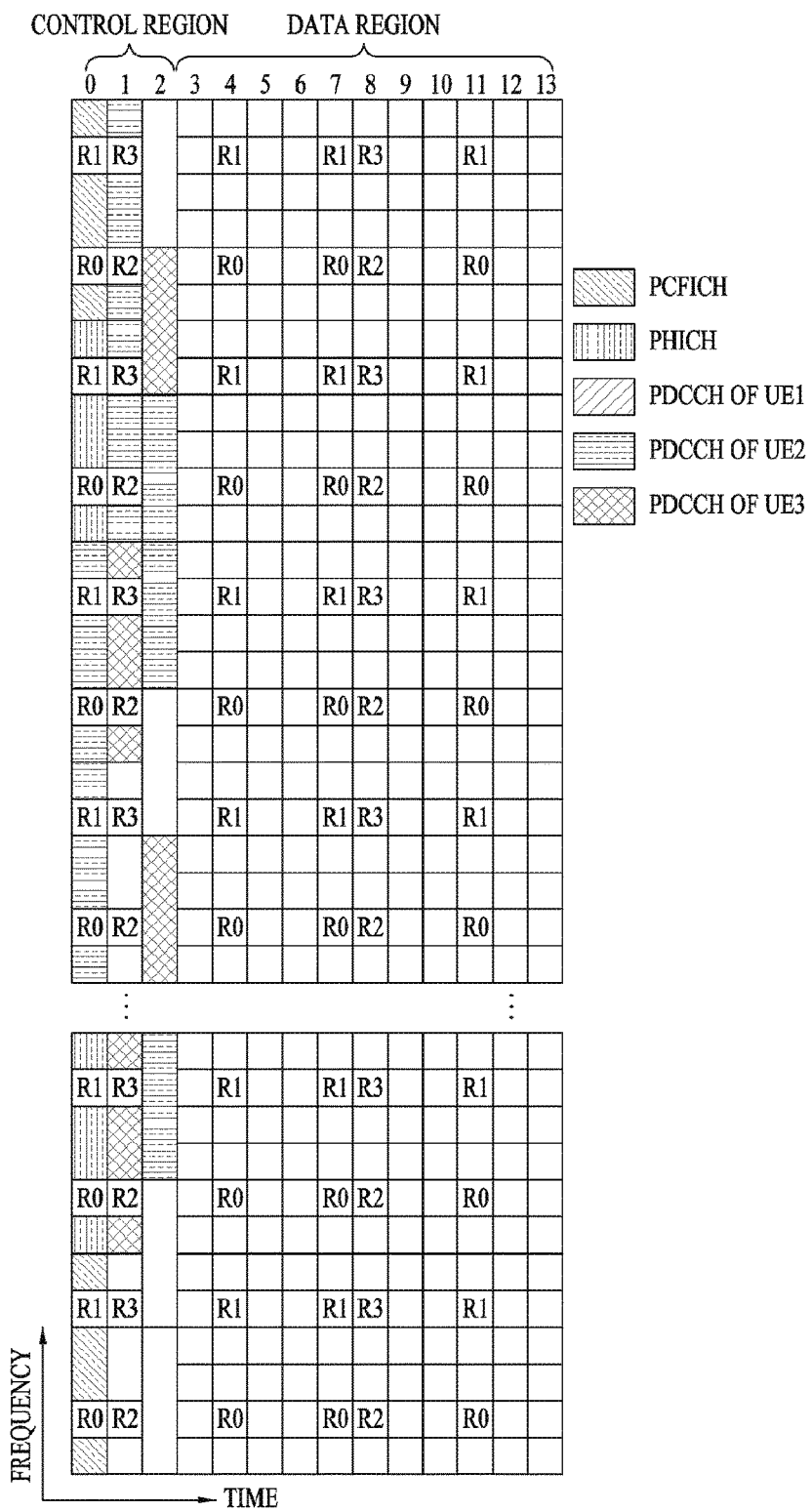
FIG. 4 is a diagram illustrating the structure of a DL radio frame used in an LTE system.

FIG. 4 is a diagram illustrating control channels contained in a control region of one subframe in a DL radio frame.

Referring to FIG. 4, one subframe includes 14 OFDM symbols. The first to third ones of the 14 OFDM symbols may be used as a control region and the remaining 11 to 13 OFDM symbols may be used as a data region, according to subframe configuration. In FIG. 4, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 5:
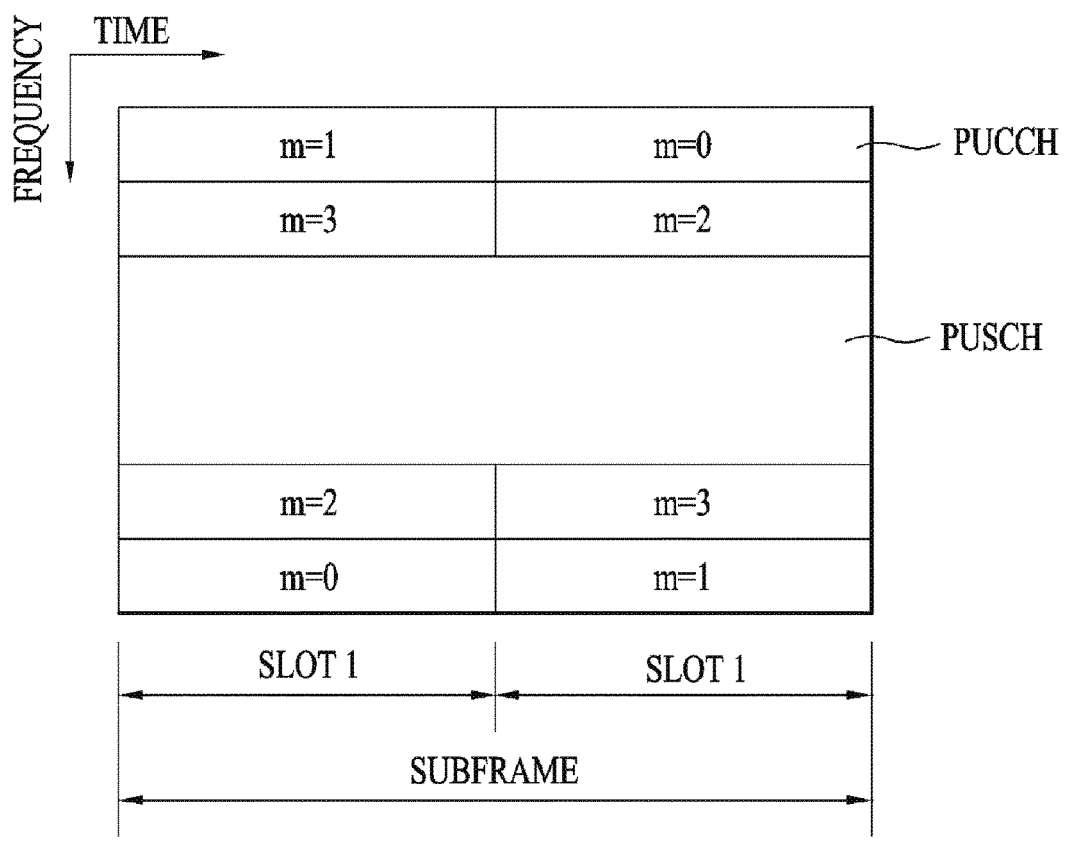
FIG. 5 is a diagram illustrating the structure of a UL subframe in an LTE system.

FIG. 5 is a diagram illustrating the structure of a UL subframe in an LTE system.

Referring to FIG. 5, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 5.

And, time capable of transmitting a sounding reference signal in a subframe corresponds to a symbol period lastly positioned in a subframe in a time axis and the sounding reference signal is transmitted through a data transmission band in frequency axis. Sounding reference signals of a plurality of UEs transmitted through a last symbol of an identical subframe can be distinguished from each other according to a frequency position.

Figure 6:
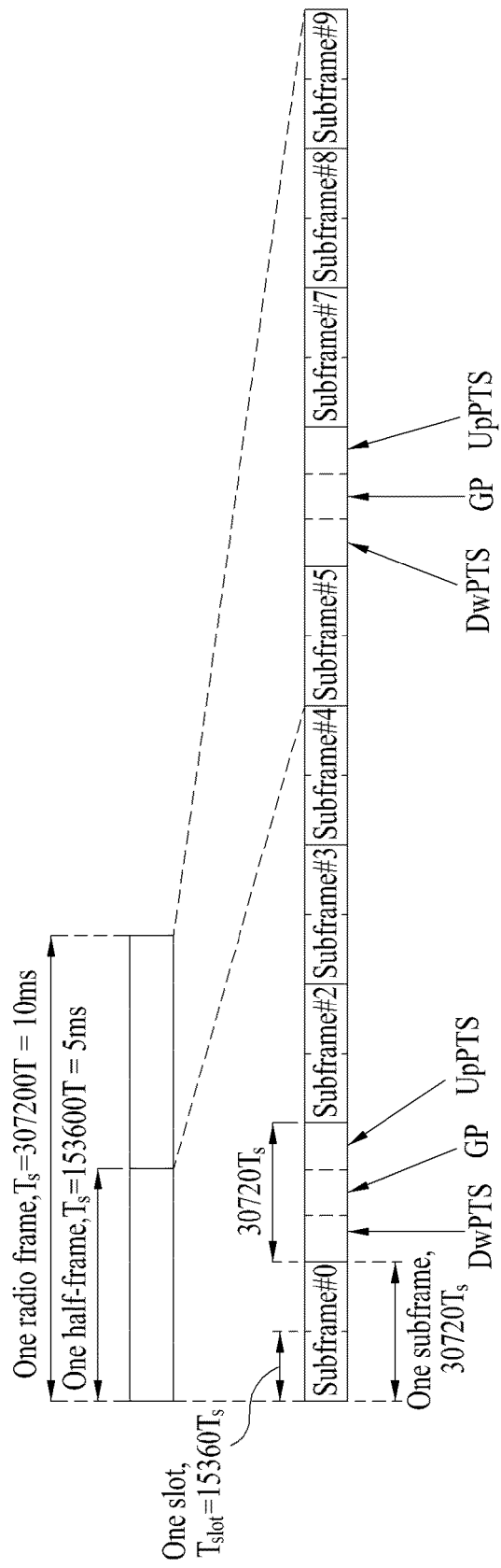
FIG. 6 illustrates a structure of a radio frame in an LTE TDD system.

FIG. 6 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Meanwhile, in an LTE TDD system, a UL/DL configuration is shown in Table 1 below.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D, U, and S refer to a downlink subframe, an uplink subframe, and the special subframe. In addition, Table 1 also shows downlink-to-uplink switch-point periodicity in an uplink/downlink subframe configuration in each system.

Figure 7:
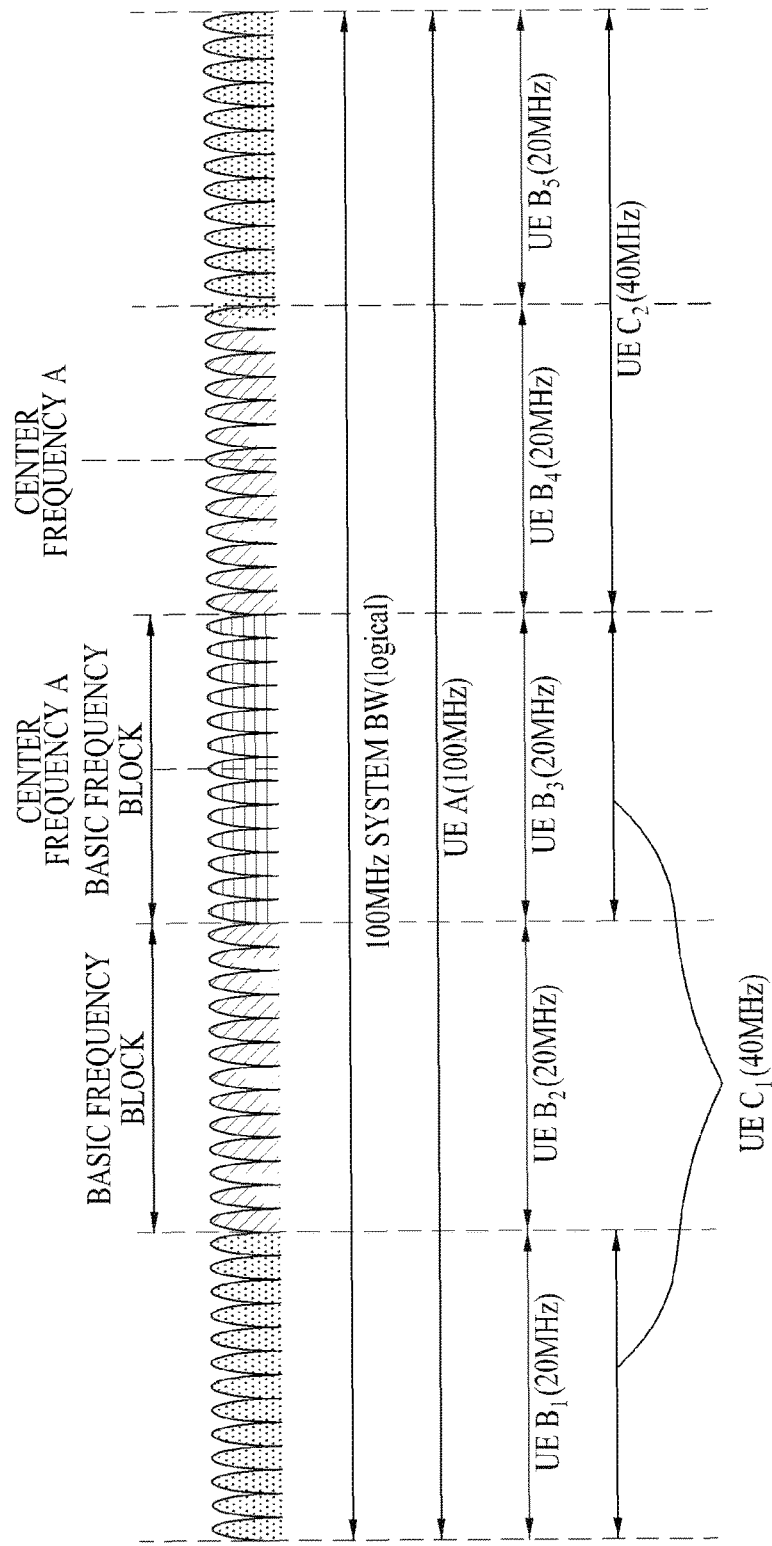
FIG. 7 is a view illustrating concept of a carrier aggregation scheme.

Hereinafter, a carrier aggregation scheme will be described. FIG. 7 is a view illustrating concept of a carrier aggregation scheme.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' will consistently used.

Figure 8:
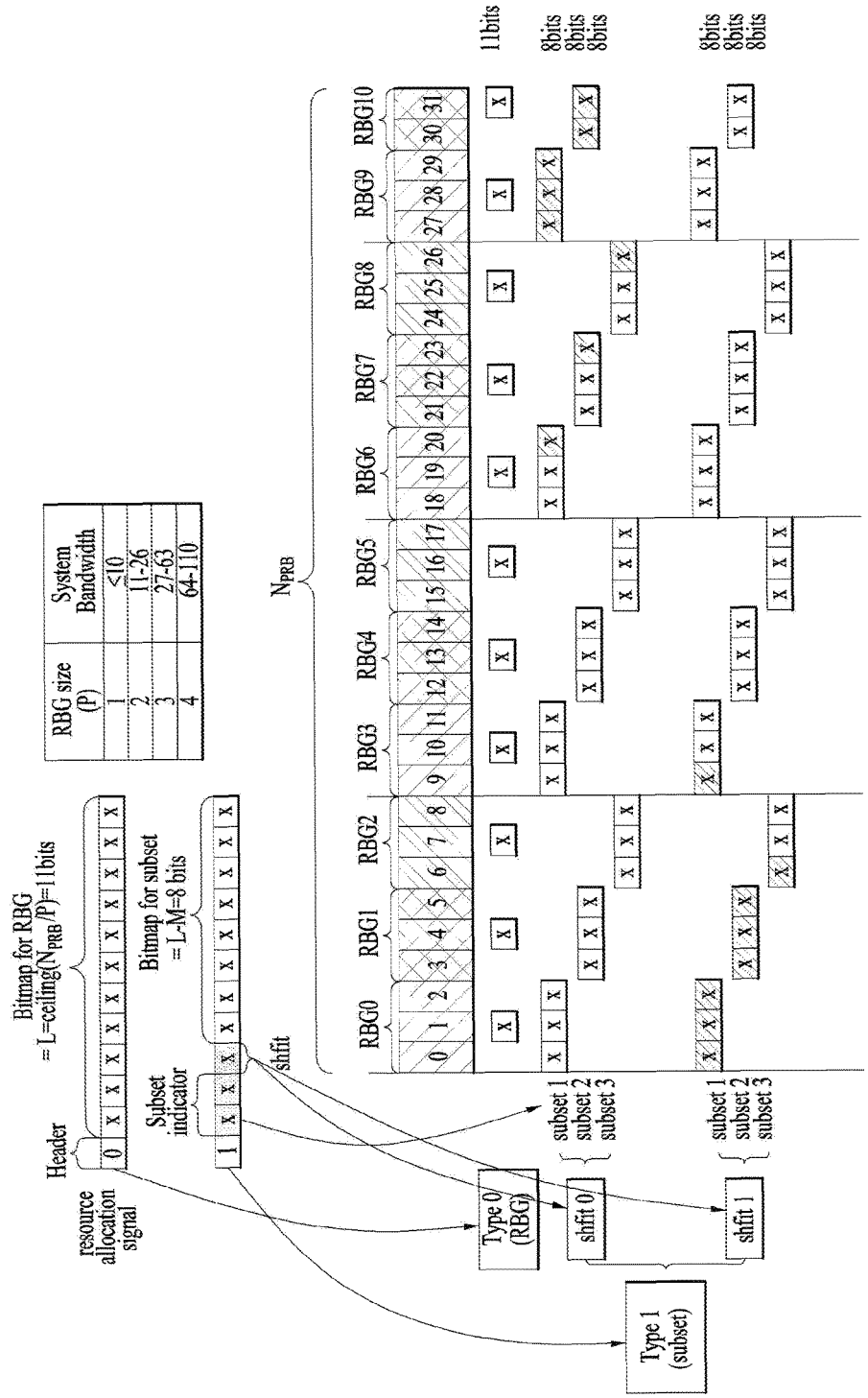
FIG. 8 illustrates RB allocation according to one embodiment.

Referring to FIG. 7, a system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. Although FIG. 7 illustrates the case in which component carriers have the same bandwidth, the case is purely exemplary, and thus, the component carriers may have different bandwidths. In addition, although FIG. 7 illustrates the case in which the component carriers are adjacent to each other in the frequency domain, FIG. 8 are logically illustrated, and thus, the component carriers may be physically adjacent to each other or may be spaced apart from each other.

Component carriers can use different center frequencies or use one common center frequency with respect to physically adjacent component carriers. For example, in FIG. 8, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

An LTE system may use one downlink component carrier and one uplink component carrier, whereas an LTE-A system may use a plurality of component carriers as illustrated in FIG. 7. In this case, a method for scheduling a data channel by a control channel may be classified into a linked carrier scheduling method and a cross carrier scheduling method.

In more detail, in the linked carrier scheduling method, a control channel transmitted through a specific component carrier schedules only a data channel through the specific component carrier like in a legacy LTE system using a single component carrier.

Meanwhile, in the cross carrier scheduling method, a control channel transmitted through a primary component carrier (primary CC) using a carrier indicator field (CIF) schedules a data channel transmitted through a data channel transmitted through the primary CC or a secondary CC.

A description will be given of a method for controlling uplink transmission power in an LTE system.

A method for controlling, by a UE, uplink transmission power thereof includes open loop power control (OLPC) and closed loop power control (CLPC). The former controls power in such a manner that attenuation of a downlink signal from a base station of a cell to which a UE belongs is estimated and compensated for. OLPC controls uplink power by increasing uplink transmission power when downlink signal attenuation increases as a distance between the UE and the base station increases. The latter controls uplink power in such a manner that the base station directly transmits information (i.e. a control signal) necessary to control uplink transmission power.

The following equation 1 is used to determine transmission power of a UE when a serving cell c transmits only a PUSCH instead of simultaneously transmitting the PUSCH and a PUCCH in a subframe corresponding to a subframe index i in a system that supports carrier aggregation.

$$P_{PUSCH,c}(i) = \min \begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases} [dBm] \quad \text{[Equation 1]}$$

The following equation 2 is used to determine PUSCH transmission power when the serving cell c simultaneously transmits the PUCCH and the PUSCH in the subframe corresponding to the subframe index i in a system supporting carrier aggregation.

$$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases} [dBm] \quad \text{[Equation 2]}$$

Parameters, which will be described in association with Equations 1 and 2, determine uplink transmission power of a UE in the serving cell c. Here, $P_{CMAX,c}(i)$ in Equation 1 indicates maximum transmittable power of the UE in the subframe corresponding to the subframe index i and $\hat{P}_{CMAX,c}(i)$ in Equation 2 indicates a linear value of $P_{CMAX,c}(i)$. $\hat{P}_{PUCCH}(i)$ in Equation 2 indicates a linear value of $P_{PUCCH}(i)$ ($P_{PUCCH(i)}$ indicating PUCCH transmission power in the subframe corresponding to subframe index i).

In Equation 1, $M_{PUSCH,c}(i)$ is a parameter indicating a PUSCH resource allocation bandwidth, which is represented as the number of resource blocks valid for the subframe index i, and is allocated by a base station. $P_{O\_PUSCH,c}(j)$ is a parameter corresponding to the sum of a cell-specific nominal component $P_{O\_NOMINAL\_PUSCH,c}(j)$ provided by a higher layer and a UE-specific component $P_{O\_UE\_PUSCH,c}(j)$ provided by the higher layer and is signaled to the UE by the base station.

j is 1 in PUSCH transmission/retransmission according to an uplink grant and j is 2 in PUSCH transmission/retransmission according to a random access response. In addition, $P_{O\_UE\_PUSCH,c}(2)=0$ and $P_{O\_NOMINAL\_PUSCH,c}(2)=P_{O\_PRE}+\Delta_{PREAMBLE\_Msg3}$. Parameters $P_{O\_PRE}$ and $\Delta_{PREAMBLE\_Msg3}$ are signaled by the higher layer.

$\alpha_c(j)$ is a pathloss compensation factor and a cell-specific parameter provided by the higher layer and transmitted as 3 bits by the base station. $\alpha \in \{0, 0.4, 0.5, 0.6, 0.7, 0.8, 0.9, 1\}$ when j is 0 or 1 and $\alpha_c(j)=1$ when is 2. $\alpha_c(j)$ is a value signaled to the UE by the base station.

Pathloss $PL_c$ is a downlink pathloss (or signal loss) estimate value in dBs, calculated by the UE, and is represented as $PL_c$=referenceSignalPower−higher layer filteredRSRP. Here, referenceSignalPower can be signaled to the UE by the base station via the higher layer.

$f_c(i)$ is a value indicating current PUSCH power control adjustment state for the subframe index i and can be represented as a current absolute value or accumulated value. When accumulation is enabled on the basis of a parameter provided by the higher layer or a TPC command $\delta_{PUSCH,c}$ is included in a PDCCH along with DCI format 0 for the serving cell c in which CRC is scrambled with temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled through the PDCCH with DCI format 0/4 or 3/3A in a subframe $i-K_{PUSCH}$. Here, $f_c(0)$ is the first value after reset of the accumulated value.

$K_{PUSCH}$ is defined in LTE as follows.

For FDD (Frequency Division Duplex), $K^{PUSCH}$ has a value of 4. As to TDD, $K_{PUSCH}$ has values as shown in Table 2.

TABLE 2

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

The UE attempts to decode a PDCCH in DCI format 0/4 with C-RNTI thereof or to decode a PDCCH in DCI format 3/3A and a DCI format for SPS C-RNTI with TPC-PUSCH-RNTI thereof in each subframe in cases other than DRX state. When DCI formats 0/4 and 3/3A for the serving cell c are detected in the same subframe, the UE needs to use $\delta_{PUSCH,c}$ provided in DCI format 0/4. When a TPC command decoded for the serving cell c is not present, DRX is generated or a subframe having index i is a subframe other than an uplink subframe in TDD, $\delta_{PUSCH,c}$ is 0 dB.

Accumulated $\delta_{PUSCH,c}$, which is signaled together with DCI format 0/4 on a PDCCH, is shown in Table 3. When a PDCCH with DCI format 0 is validated through SPS activation or released, $\delta_{PUSCH,c}$ is 0 dB. Accumulated $\delta_{PUSCH,c}$, which is signaled with DCI format 3/3A on a PDCCH, is one of SET1 of Table 3 or one of SET2 of Table 4, determined by a TPC-index parameter provided by the higher layer.

TABLE 3

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 4

| TPC Command Field in DCI format 3A | Accumulated $\delta_{PUSCH,c}$ [dB] |
|---|---|
| 0 | −1 |
| 1 | 1 |

When the UE reaches maximum transmission power $\hat{P}_{CMAX}(i)$ in the serving cell c, a positive TPC command is not accumulated for the serving cell c. Conversely, when the UE reaches minimum transmission power, a negative TPC command is not accumulated.

The following equation 3 is related to uplink power control with respect to a PUCCH in LTE.

$$P_{PUCCH}(i) = \min\left\{\begin{array}{l} P_{CMAX,c}(i), \\ P_{O\_PUCCH} + PL_c + h(n_{CQI}, n_{HARQ}, n_{SR}) + \Delta_{F\_PUCCH}(F) + \Delta_{T \times D}(F') + g(i) \end{array}\right\}[dBm] \quad \text{[Equation 3]}$$

In Equation 3, i indicates a subframe index and c indicates a cell index. When a UE is configured by a higher layer to transmit a PUCCH over through antenna ports, $\Delta_{T \times D}(F')$ is provided to the UE by the higher layer. In other cases, $\Delta_{T \times D}(F')$ is 0. Parameters with respect to a cell having the cell index c will now be described.

$P_{CMAX,c}(i)$ indicates maximum transmission power of a UE, $P_{O\_PUCCH}$ is a parameter corresponding to the sum of cell-specific parameters and signaled by a base station through higher layer signaling, $PL_c$ is a downlink pathloss (or signal loss) estimate value calculated in dBs by the UE and is represented as $PL_c$=referenceSignalPower−higher layer filteredRSRP. h(n) is a value depending on PUCCH format, $n_{CQI}$ is the number of information bits with respect to channel quality information (CQI) and $n_{HARQ}$ indicates the number of HARQ bits. In addition, $\Delta_{F\_PUCCH}(F)$ is a relative value with respect to PUCCH format $1a$ and a value corresponding to PUCCH format #F, which is signaled by the base station through higher layer signaling. g(i) indicates a current PUCCH power control adjustment state of a subframe having index i.

g(0)=0 when $P_{O\_UE\_PUCCH}$ is changed in the higher layer and g(0)=$\Delta P_{rampup}+\delta_{msg2}$ otherwise. $\delta_{msg2}$ is a TPC command indicated in a random access response $\Delta P_{rampup}$ corresponds to total power ramp-up from the first to last preambles, provided by the higher layer.

When a UE reaches maximum transmission power $P_{CMAX,c}(i)$ in a primary cell, a positive TPC command is not accumulated for the primary cell. When the UE reaches minimum transmission power, a negative TPC command is not accumulated. The UE resets accumulation when $P_{O\_UE\_PUCCH}$ changed by the higher layer or upon reception of a random access response.

Tables 5 and 6 show $\delta^{PUCCH}$ indicated by a TPC command in DCI formats. Particularly, Table 5 shows $\delta^{PUCCH}$ indicated in DCI formats other than DCI format 3A and Table 6 shows $\delta^{PUCCH}$ indicated in DCI format 3A.

TABLE 5

| TPC Command Field in DCI format 1A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 6

| TPC Command Field in DCI format 3A | $\delta_{PUCCH}$ [dB] |
|---|---|
| 0 | −1 |
| 1 | 1 |

Equation 4 in the following corresponds to an equation related to power control of a sounding reference signal (SRS) in LTE system.

$$P_{SRS,c}(i) = \min\begin{Bmatrix} P_{CMAX,c}(i) \\ P_{SRS\_OFFSET,c}(m) + 10\log_{10}(M_{SRS,c}) + P_{O\_PUSCH,c}(j) + \alpha_c(j) \cdot PL_c + f_c(i) \end{Bmatrix} [dBm] \quad [\text{Equation 4}]$$

In Equation 4, i corresponds to a subframe index and c corresponds to a cell index. In this case, $P_{CMAX,c}(i)$ corresponds to maximum power capable of being transmitted by a UE and $P_{SRS\_OFFSET,c}(m)$ corresponds to a value configured by an upper layer. If m is 0, it may correspond to a case of transmitting a periodic sounding reference signal. If m is not 0, it may correspond to a case of transmitting an aperiodic sounding reference signal. $M_{SRS,c}$ corresponds to a sounding reference signal bandwidth on a subframe index i of a serving cell c and is represented by the number of resource blocks.

$f_c(i)$ corresponds to a value indicating a current PUSCH power control adjustment status for a subframe index i of a serving cell c. $P_{O\_PUSCH,c}(j)$ and $\alpha_c(j)$ are also identical to what is mentioned earlier in Equation 1 and 2.

Hereinafter, a Sounding Reference Signal (SRS) will be described.

The SRS is composed of constant amplitude zero auto correlation (CAZAC) sequences. SRSs transmitted from several UEs are CAZAC sequences $r^{SRS}(n)=r_{u,v}^{(\alpha)}(n)$ having different cyclic shift values a according to Equation 1.

$$\alpha = 2\pi \frac{n_{SRS}^{cs}}{8} \quad [\text{Equation 5}]$$

Here, $n_{SRS}^{cs}$ is a value set to each UE by a higher layer and has an integer value of 0 to 7. Accordingly, the cyclic shift value may have eight values according to $n_{SRS}^{cs}$.

CAZAC sequences generated from one CAZAC sequence through cyclic shift have zero correlation values with sequences having different cyclic shift values. Using such property, SRSs of the same frequency domain may be divided according to CAZAC sequence cyclic shift values. The SRS of each UE is allocated onto the frequency axis according to a parameter set by the eNB. The UE performs frequency hopping of the SRS so as to transmit the SRS with an overall uplink data transmission bandwidth.

Hereinafter, a detailed method of mapping physical resources for transmitting SRSs in an LTE system will be described.

In order to satisfy transmit power $P_{SRS}$ of a UE, an SRS sequence $r^{SRS}(n)$ is first multiplied by an amplitude scaling factor $\beta_{SRS}$ and is then mapped to a resource element (RE) having an index (k, 1) from $r^{SRS}(0)$ by Equation 6.

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \quad [\text{Equation 6}]$$

Here, $k_0$ denotes a frequency domain start point of an SRS and is defined by Equation 7.

$$k_0 = k_0' + \sum_{b=0}^{B_{SRS}} 2M_{sc,b}^{RS} n_b \quad [\text{Equation 7}]$$

Here, $n_b$ denotes a frequency location index. $k'_0$ for a general uplink subframe is defined by Equation 8 and $k'_0$ for an uplink pilot time is defined by Equation 9.

$$k_0' = (\lfloor N_{RB}^{UL}/2 \rfloor - m_{SRS,0}/2)N_{SC}^{RB} + k_{TC} \quad [\text{Equation 8}]$$

$$k_0' = \begin{cases} (N_{RB}^{UL} - m_{SRS,0}^{max})N_{sc}^{RB} + k_{TC} & \text{if } ((n_f \bmod 2) \times \\ & (2 - N_{SP}) + n_{hf}) \bmod 2 = 0 \\ k_{TC} & \text{otherwise} \end{cases} \quad [\text{Equation 9}]$$

In Equations 8 and 9, $k_{TC}$ denotes a transmissionComb parameter signaled to a UE via a higher layer and has a value of 0 or 1. In addition, $n_{hf}$ is 0 in an uplink pilot time slot of a first half frame and is 0 an uplink pilot slot of a second half frame. $M_{sc,b}^{RS}$ is the length, that is, the bandwidth, if the SRS sequence expressed in subcarrier units defined by Equation 10.

$$M_{sc,b}^{RS} = m_{SRS,b} N_{sc}^{RB}/2 \quad [\text{Equation 10}]$$

In Equation 10, $m_{SRS,b}$ is a value signaled from an eNB according to an uplink bandwidth $N_{RB}^{UL}$.

The UE may perform frequency hopping of the SRS so as to transmit the SRS with the overall uplink data transmission bandwidth. Such frequency hopping is set by a parameter $b_{hop}$ having a value of 0 to 3 received from a higher layer.

If frequency hopping of the SRS is inactivated, that is, $b_{hop} \geq B_{SRS}$, a frequency location index $n_b$ has a constant value as shown in Equation 11. Here, $n_{RRC}$ is a parameter received from a higher layer.

$$n_b = \lfloor 4n_{RRC}/m_{SRS,b} \rfloor \bmod N_b \quad [\text{Equation 11}]$$

Meanwhile, if frequency hopping of the SRS is activated, that is, $b_{hop} < B_{SRS}$, a frequency location index $n_b$ is defined by Equations 12 and 13.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{[Equation 12]}$$

$$F_b(n_{SRS}) = \quad \text{[Equation 13]}$$

$$\begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \lfloor n_{SRS} / \prod_{b'=b_{hop}}^{b-1} N_{b'} \rfloor & \text{if } N_b \text{ odd} \end{cases}$$

Here, $n_{SRS}$ is a parameter used to calculate the number of times of transmitting the SRS and is defined by Equation 14.

$$n_{SRS} = \begin{cases} 2N_{SP}n_f + 2(N_{SP}-1)\lfloor \frac{n_s}{10} \rfloor + \lfloor \frac{T_{offset}}{T_{offset\_max}} \rfloor, & \text{for 2 ms SRS periodicity of TDD frame structure} \\ \lfloor (n_f \times 10 + \lfloor n_s/2 \rfloor)/T_{SRS} \rfloor, & \text{otherwise} \end{cases} \quad \text{[Equation 14]}$$

In Equation 14, $T_{SRS}$ denotes the periodicity of SRS and $T_{offset}$ denotes a subframe offset of an SRS. In addition, $n_s$ denotes a slot number and $n_f$ denotes a frame number.

A UE-specific SRS configuration index $I_{SRS}$ for setting the periodicity $T_{SRS}$ and the subframe offset $T_{offset}$ of a UE-specific SRS signal is shown in Table 7-Table 10 according to FDD and TDD. In particular, Table 7 and Table 8 indicate a FDD system and a TDD system, respectively. Table 7 and Table 8 in the following show a period related to a triggering type 0, i.e., a periodic SRS, and offset information.

TABLE 7

| SRS Configuration Index $I_{SRS}$ | $T_{SRS}$ (ms) | SRS Periodicity SRS Subframe Offset $T_{offset}$ |
|---|---|---|
| 0-1 | 2 | $I_{SRS}$ |
| 2-6 | 5 | $I_{SRS}$ - 2 |
| 7-16 | 10 | $I_{SRS}$ - 7 |
| 17-36 | 20 | $I_{SRS}$ - 17 |
| 37-76 | 40 | $I_{SRS}$ - 37 |
| 77-156 | 80 | $I_{SRS}$ - 77 |
| 157-316 | 160 | $I_{SRS}$ - 157 |
| 317-636 | 320 | $I_{SRS}$ - 317 |
| 637-1023 | reserved | reserved |

TABLE 8

| SRS Configuration Index $I_{SRS}$ | $T_{SRS}$ (ms) | SRS Periodicity SRS Subframe Offset $T_{offset}$ |
|---|---|---|
| 0-1 | 2 | $I_{SRS}$ |
| 2-6 | 5 | $I_{SRS}$ - 2 |
| 7-16 | 10 | $I_{SRS}$ - 7 |
| 17-36 | 20 | $I_{SRS}$ - 17 |
| 37-76 | 40 | $I_{SRS}$ - 37 |
| 77-156 | 80 | $I_{SRS}$ - 77 |
| 157-316 | 160 | $I_{SRS}$ - 157 |
| 317-636 | 320 | $I_{SRS}$ - 317 |
| 637-1023 | reserved | reserved |

Meanwhile, in case of the periodic SRS, transmission is performed in a subframe satisfying Equation 15 in the following in a FDD system or a TDD system where $T_{SRS}$ is greater than 2 ($T_{SRS}$>2). Yet, in Equation 15, $k_{SRS}$ corresponds to $\{0, 1, \ldots, 9\}$ in case of the FDD system, whereas $k_{SRS}$ is determined according to Table 9 in the following in case of the TDD system.

$$(10 \cdot n_f + k_{SRS} - T_{offset}) \bmod T_{SRS} = 0 \quad \text{[Equation 15]}$$

TABLE 9

| | subframe index n | | | | | | | | | |
|---|---|---|---|---|---|---|---|---|---|---|
| | | 1 | | | | | 6 | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | | 0 | 1 | 2 | 3 | 4 | | 5 | 6 | 7 | 8 | 9 |
| $k_{SRS}$ in case UpPTS length of 1 symbol | | 1 | | 2 | 3 | 4 | | 6 | | 7 | 8 | 9 |

And, in case of a TDD system where $T_{SRS}$ corresponds to 2 in Table 8, transmission is performed in a subframe satisfying Equation 16 in the following.

$$(k_{SRS} - T_{offset}) \bmod 5 = 0 \quad \text{[Equation 16]}$$

Table 10 and Table 11 in the following show a period related to a triggering type 1, i.e., an aperiodic SRS, and offset information. In particular, Table 10 and Table 11 indicate a FDD system and a TDD system, respectively.

TABLE 10

| SRS Configuration Index $I_{SRS}$ | $T_{SRS,1}$ (ms) | SRS Periodicity SRS Subframe Offset $T_{offset,1}$ |
|---|---|---|
| 0-1 | 2 | $I_{SRS}$ |
| 2-6 | 5 | $I_{SRS}$ - 2 |
| 7-16 | 10 | $I_{SRS}$ - 7 |
| 17-31 | reserved | reserved |

TABLE 11

| SRS Configuration Index $I_{SRS}$ | SRS Periodicity $T_{SRS,1}$ (ms) | SRS Subframe Offset $T_{offset,1}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ - 10 |
| 15-24 | 10 | $I_{SRS}$ - 15 |
| 25-31 | reserved | reserved |

Meanwhile, if a triggering bit of the aperiodic SRS is detected in a subframe #n, an aperiodic SRS corresponding to the triggering bit is transmitted in a first subframe satisfying Equation 17 or Equation 18 in the following appearing after a subframe index #n+k (where k≥4). In particular, Equation 17 in the following is used for a FDD system or a TDD system of which $T_{SRS}$ is greater than 2 ($T_{SRS} \geq 2$) in the Table 11. Equation 18 in the following is used for a TDD system of which $T_{SRS}$ is equal to 2 ($T_{SRS}=2$) in the Table 11. Yet, in case of the FDD system, $k_{SRS}$ corresponds to {0, 1, . . . , 9}. In case of the TDD system, $k_{SRS}$ is determined according to the Table 9.

$$(10 \cdot n_f + k_{SRS} - T_{offset,1}) \bmod T_{SRS,1} = 0 \quad \text{[Equation 17]}$$

$$(k_{SRS} - T_{offset,1}) \bmod 5 = 0 \quad \text{[Equation 18]}$$

Resource Allocation Type

A description will be given of a method of scheduling a resource block (RB) corresponding to a resource allocation unit.

To freely schedule the number of PRBs, $N_{PRB}$, of a system using density of one PRB, an $N_{PRB}$-bit bitmap is needed per scheduled UE. When the number of PRBs, $N_{PRB}$, of the system is large, transmission of PRBs lays a burden on the quantity of control information. Accordingly, methods of decreasing density or dividing a band and performing transmission with increased density only in some regions of the band are required.

In 3GPP LTE, a method of configuring a bitmap in consideration of overhead during transmission using the bitmap, as described above, has been proposed.

FIG. 8 illustrates RB allocation according to one embodiment.

Signaling for resource allocation includes a header and a bitmap. The header indicates a signaling method to represent a bitmap interpretation method. The bitmap is used through an RBG method and a subset method.

The RBG method groups several RBs and allocates an RBG group as a basic unit. In this case, while resource allocation density decreases according to a group size, the number of bits of the bitmap can be reduced. Since $N_{PRB}=32$ in the example of FIG. 8, a 32-bit bitmap is needed for resource allocation in units of one RB. However, if 3 RBs are grouped ($P=M_{RBG}=3$) and resources are allocated with density in units of an RGB (RB group), 11 groups are present and thus only an 11-bit bitmap is required, remarkably reducing the quantity of control information. However, such resource allocation on an RGB basis reduces density, making allocation of two or fewer RBs impossible, and thus detailed resource allocation becomes impossible. An RGB size is defined according to the number of RBs set to a system frequency bandwidth, as shown in Table 13.

TABLE 13

| System Bandwidth $N_{RB}^{DL}$ | RBG Size (P = $M_{RBG}$) |
|---|---|
| ≤10 | 1 |
| 11-26 | 2 |
| 27-63 | 3 |
| 64-110 | 4 |

To compensate the RBG method, the subset method is used. The subset method sets several RBGs to a subset and allocates resources in units of an RB within a corresponding subset. When 3 subsets, which correspond to the RBG unit, is set in order to use the 11-bit bitmap in the RBG method, $N_{RB}/P=\text{ceiling}(32/3)=11$. Accordingly, RBs in subsets can be indicated in units of an RB using the same 11 bits. However, it is necessary to indicate whether a bitmap is used for RGB unit allocation or the subset method and to indicate a subset when the bitmap is used for the subset method, and thus header information is needed. If the header information indicates only the RBG method or the subset method and some bits of the bitmap used for RBG are used to indicate subset type, RBs within all subsets may not be indicated. To solve this, 1 bit may be extracted from the RBG bitmap to shift positions of RBs indicated by the subset bitmap.

Figure 9:
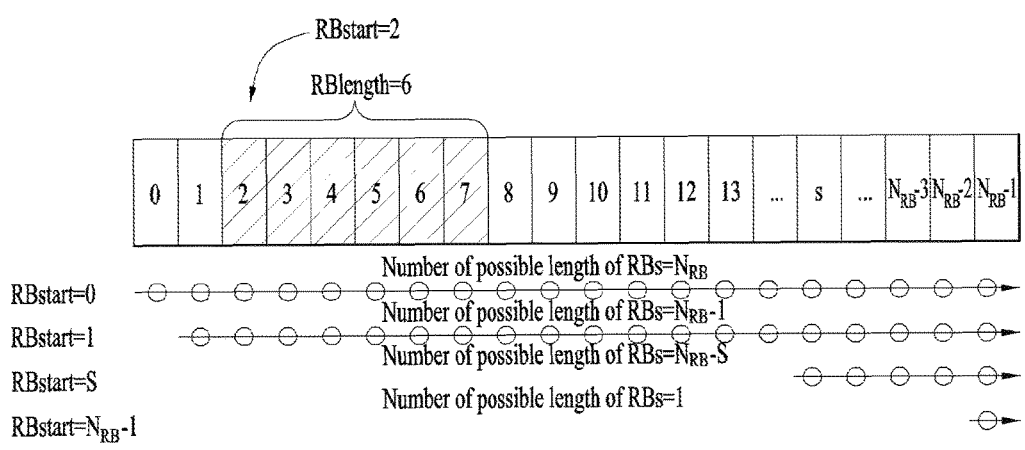
FIG. 9 illustrates RB allocation according to another embodiment.

FIG. 9 illustrates RB allocation according to another embodiment of the present invention.

Considering a case in which only a bundle of consecutive RBs is allocated to a UE, information about the allocated RBs may be represented by the start points and the number of RBs. In this case, an available RB length depends on the start point, as illustrated in FIG. 9, and thus the number of combinations of RB allocation is $N_{RB}(N_{RB}+1)/2$. Accordingly, the number of bits necessary therefor is ceiling($\log_2(N_{RB}(N_{RB}+1)/2)$). Here, ceiling(x) denotes rounding x up to the closest integer.

Consequently, the number of bits does not considerably increase according to an increase in $N_{RB}$, compared to the bitmap method. This method is called a compact method in the following.

For example, when a total number of RBs is 32 and resources are scheduled with density of 1RB, 32 bits are needed when a bitmap is used whereas ceiling($\log_2(32(32+1)/2)$)=10 bits are needed when the compact method is used. Although the number of necessary bits is not remarkably reduced compared to 11 bits when resources are allocated in units of an RBG, there is an advantage that resources can be allocated with density of 1 RB. However, two or more non-consecutive resources cannot be allocated.

Figure 10:
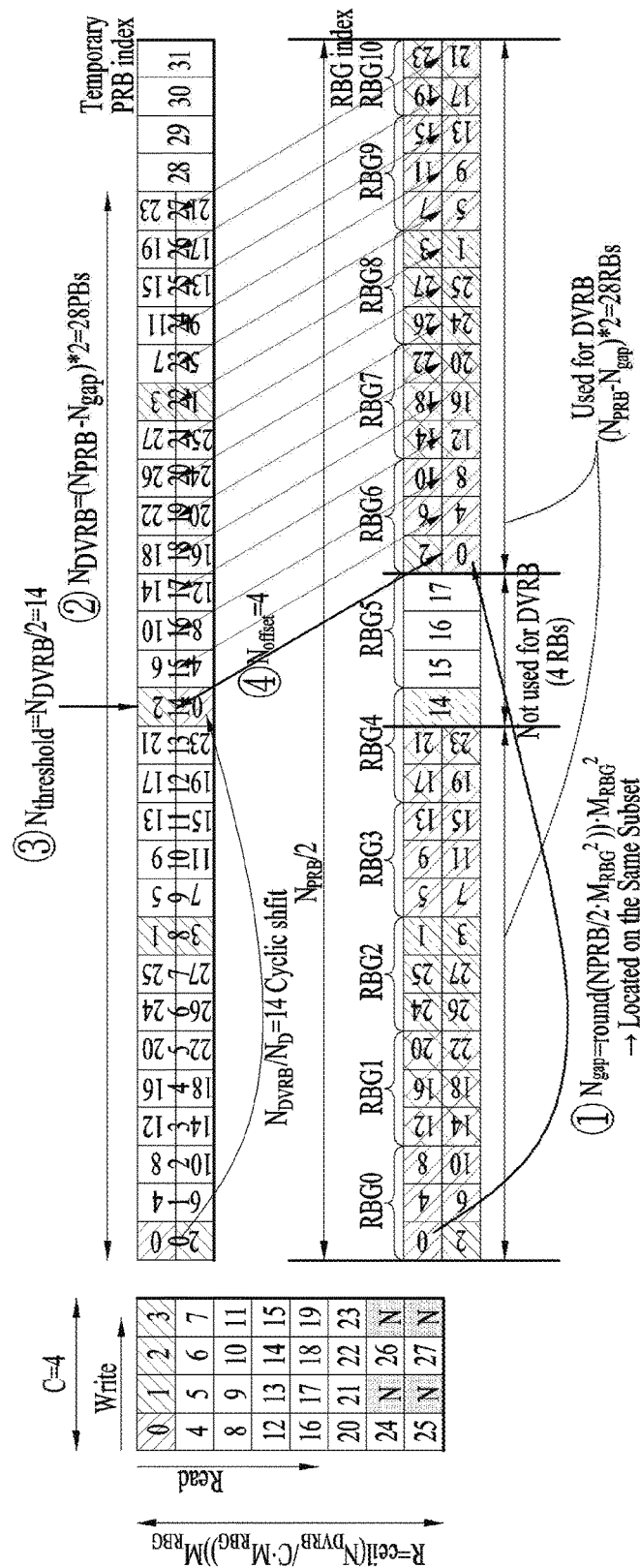
FIG. 10 illustrates DVRB allocation.

FIG. 10 illustrates DVRB allocation.

A gap size $N_{Gap}$ and an RBG size $M_{RBG}$ are determined according to system bandwidth and an interleaver size is determined according thereto. Consecutive DVRB indices are pre-arranged to be distributed without corresponding to consecutive PRBs when DVRB indices are interleaved and correspond to PRBs, a cyclic shift is added such that the second slot is mapped while being separated from the first slot to enable dispersion of split sets, and an offset value is added to values corresponding to half of more of the total number of DVRBs to satisfy the aforementioned $N_{Gap}$ conditions. This mapping method is configured such that consecutive DVRB indices are included in the same subset if possible and RBGs are sequentially filled in consideration of combination with the bitmap method using the aforementioned RBG method and subset method.

When a UE is allocated two DVRBs through the aforementioned procedure, the diversity order increases to 4 and thus further diversity gain can be obtained.

MTC (Machine Type Communication)

At least part of the aforementioned contents of the LTE-A system is applicable to a wireless communication system, an eNB and/or an MTC UE. Systems following LTE-A consider configuration of an inexpensive/low-specification UE mainly used for data communication such as metering, water level measurement, utilization of monitoring cameras and vending machine inventory reporting. Such UE is called machine type communication (MTC) UE or bandwidth reduced low complexity (BL)/coverage enhancement (CE) UE for convenience. In the case of the MTC UE, the quantity of transmitted data is small and uplink/downlink data transmission/reception are not frequently performed. Accordingly, it is efficient to reduce UE price and battery consumption according to a low data rate.

For non-MTC UEs, a maximum of 20 MHz is supported per carrier. However, to reduce MTC UE costs, a supported bandwidth may be set to less than 20 MHz (e.g., 6 RBs). Such bandwidth reduction can be applied to uplink/downlink, RF/baseband devices and data/control channels. Specifically, MTC UE uplink/downlink operations may be performed in a bandwidth reduced to 6 RBs, for example, differently from the operation system bandwidth of the corresponding cell. In the following, a reduced band may be referred to as a narrow band or a subband.

Figure 11:
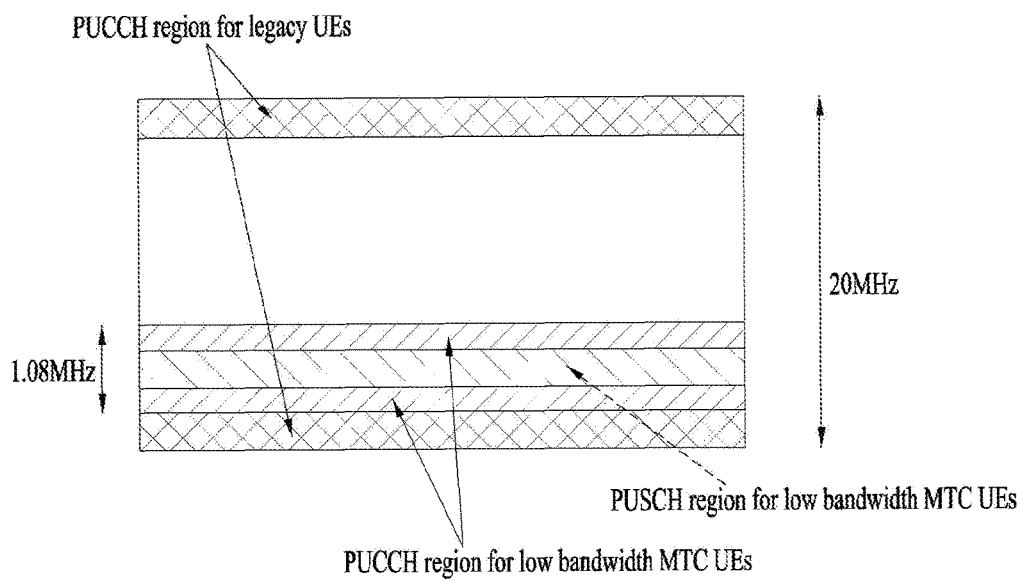
FIG. 11 illustrates an uplink channel of an MTC UE according to an embodiment of the present invention.

FIG. 11 illustrates an uplink channel of an MTC UE according to an embodiment of the present invention. Referring to FIG. 11, it is assumed that a system uplink bandwidth is 20 MHz and a bandwidth set to the UE is 1.08 MHz. Here, some frequency resources within the UE bandwidth may not be used for data transmission for convenience of implementation of the MTC UE.

While the size of one subband is assumed to be 6 RBs in the following for convenience of description, subbands of different sizes may be supported. When a bandwidth of a specific cell is $N_{RB}$, an integer number of subbands, which does not exceed "$N_{RB}/6$", may be present in the bandwidth. In the following description, the bandwidth of one cell may be called a system bandwidth for convenience. A bandwidth may refer to a DL bandwidth or a UL bandwidth. The DL bandwidth and the UL bandwidth may be set to the same bandwidth or different bandwidths according to system environments.

The MTC UE has characteristics that mobility is low and channel environments hardly change. In LTE-A, various CE schemes for allowing the MTC UE to have wider uplink/downlink coverages are discussed. To improve the coverage of the MTC UE and to overcome poor propagation environments, a repeated transmission method may be used. A redundancy version may be set to the same version or different versions for repeated transmission.

When a channel state of a subband used by the MTC UE in a system band is poor, not only are signals deteriorated but also the battery of the MTC UE that repeatedly transmits and receives signals for a long time in the poor subband is rapidly consumed. To solve such problems, the subband in which a signal is repeatedly transmitted may be varied with time (e.g., frequency hopping or frequency hopping subband). As the subband varies, a diversity gain may be generated and the number of repetitions of transmission may be reduced. Accordingly, frequency hopping can enhance signal transmission/reception performance of the MTC UE and reduce battery consumption of the MTC UE. Therefore, an eNB can set information about frequency hopping and a frequency hopping subband to the MTC UE. In MTC signal frequency hopping, a signal transmission frequency within a subband (or band) is not hopped and the subband is varied (e.g., hopped).

1. PUSCH Resource Allocation and PUCCH Resource Allocation

The MTC UE is allocated a PUSCH resource by an eNB within the operating bandwidth of the MTC UE. The PUSCH resource may be allocated through the following methods, for example.

(1) PUSCH Resource Allocation Method 1

The eNB may split an uplink system bandwidth into a plurality of subbands and allocate a PUSCH resource of a specific subband to the MTC UE. The eNB may indicate information about the subband to which the PUSCH resource is allocated through higher layer signaling (e.g., RRC signaling) or an MTC PDCCH (e.g., DCI).

Alternatively, a position to which the PUSCH resource is allocated may be fixed to a predefined position.

Alternatively, the subband to which the PUSCH resource is allocated may be varied according to frequency hopping. For example, the subband including the PUSCH resource may be varied according to a predefined frequency hopping pattern. Specifically, it is assumed that N subbands are present for the MTC UE and subbands corresponding to respective subframes in one radio frame sequentially have indices of {0, 2, 4, 0, 2, 4, 0, 2, 4, 1}. The MTC UE may transmit a PUSCH while hopping subbands in the order of subbands #0, 2, 4, . . . for the subframes. A subband hopping pattern for PUSCH transmission may be cell-specific or UE-specific. For example, a UE-specific subband hopping pattern may be used to reduce collision that may occur between UEs.

(2) PUSCH Resource Allocation Method 2

According to another embodiment of the present invention, a PUSCH resource may be allocated to the MTC UE through an MTC PDCCH (e.g., DCI) within an uplink system bandwidth. In general, DL data transmission (e.g., PDSCH transmission) is performed in the same subframe as a subframe in which DL resource allocation information is received through a PDCCH, whereas UL data transmission (e.g., PUSCH transmission) is performed after 4 subframes from a subframe in which UL resource allocation information is received through a PDCCH. Accordingly, a UE tunes to an RF corresponding to an allocated UL resource (e.g., within 4 subframes) and transmits UL data after reception of the UL resource allocation information through the PDCCH in the case of general uplink transmission.

The eNB may signal information about a PUCCH resource in order to set the PUCCH resource to the MTC UE. For example, methods of signaling the information about the PUCCH resource may include (i) a method of signaling an RB index at which the PUCCH resource starts, which may additionally signal an ACK/NACK resource index and/or a CSI resource index, (ii) a method of signaling the start index of an RB in which ACK/NACK is transmitted, (iii) a method of signaling the start index of an RB in which CSI is transmitted and (iv) a method of signaling a center frequency when a PUCCH is transmitted.

(3) PUCCH Resource Allocation

According to one embodiment (e.g., PUSCH resource allocation method 1), a PUCCH resource may be set within a subband configured for PUSCH transmission. For example, a PUSCH resource and the PUCCH resource may be present in the same subband.

According to another example, the PUSCH resource and the PUCCH resource may be set to different subbands.

When a PUSCH is statically fixed or quasi-statically set, it is desirable that positions of the PUCCH and the PUSCH be set to one subband. When the PUSCH is dynamically set by higher layer signaling or DCI, however, the PUSCH and the PUCCH may be set to different subbands in order to reduce overhead of changing the position of the PUCCH according to PUSCH position change.

In PUSCH resource allocation method 2, the PUSCH resource may be varied by a PDCCH over which DCI is transmitted within the uplink system bandwidth. The PUCCH resource may be quasi-statically set using higher layer signaling (e.g., RRC signaling).

2. UL Transmission of MTC UE (1) SRS Transmission

According to an embodiment of the present invention (e.g., in order to support PUSCH resource allocation method 1), the MTC UE may transmit an SRS such that the eNB can acquire UL channel information of each subband.

SRS transmission is limited within a subband. If the MTC UE is configured to perform SRS transmission for a band other than the corresponding subband, the MTC UE may not perform SRS transmission (for the band other than the corresponding subband).

If the MTC UE is configured to perform SRS transmission over two subbands, the MTC UE may not perform SRS transmission. Alternatively, the MTC UE may transmit an SRS only for a band belonging to the corresponding subbands.

The MTC UE may sequentially transmit SRSs with respect to respective subbands in order to support selection of a best subband. In this case, an SRS transmission band may be set to a specific frequency resource instead of the subbands.

In selection of an initial subband, the MTC UE may sequentially transmit SRSs with respect to respective subbands after random access and then may be allocated the initial subband.

According to a conventional SRS transmission method, an SRS is transmitted in the last SC-FDMA symbol of a subframe. However, such restrictions may not be applied to SRS transmission of the MTC UE. For example, when the SRS transmission band of the MTC UE is limited to a specific subband, the SRS may be transmitted in a symbol other than the last SC-FDMA symbol.

According to an embodiment of the present invention, last n symbols (e.g., the second slot) or first n symbols (e.g. the first slot) of a subframe may not be used for UL/DL transmission/reception in consideration of delay (e.g., guard period) necessary for frequency tuning (e.g., higher layer signaling). For example, when the MTC UE transmits an uplink physical channel, a subband in which the uplink physical channel is transmitted may be varied (e.g., frequency hopping). Specifically, it is assumed that the MTC UE transmits a first UL physical channel through a first subband in a first subframe and transmits a second UL physical channel through a second subband in a second subframe. If the first subframe and the second subframe are consecutive and the first subband and the second subband differ from each other, frequency retuning is necessary for the MTC UE to transmit the second UL physical channel after transmission of the first UL physical channel.

The MTC UE requires frequency retuning, differently from normal UEs, because a frequency band that can be processed for low costs and complexity may be limited to a specific subband. In other words, a non-MTC UE can process all system bands (e.g., the first subband+the second subband) at a time and thus the non-MTC UE may transmit a signal through the first subband in the first subframe and then immediately transmit a signal through the second subband in the second subframe (e.g., a GP is not required for frequency retuning). However, the MTC UE can process only part (e.g., the first subband) of the entire system band at a time, and thus the MTC UE needs to transmit a signal through the first subband in the first subframe and then perform frequency retuning to the second subband. The MTC UE may transmit a signal through the second subband in the second subframe after frequency retuning to the second subband. In the case of the MTC UE, a time necessary for frequency retuning needs to be secured in order to transmit signals through different subbands in consecutive subframes. To secure the time necessary for frequency retuning, at least part of last n symbols of the first subframe and/or first n symbols of the second subframe may be set for frequency retuning. The MTC UE cannot perform UL signal transmission during frequency retuning. That is, UL signal transmission is not performed in symbols used for frequency retuning.

While the time necessary for frequency retuning is n SC-FDMA symbols (e.g., 2 symbols), for example, the time is not limited thereto. Although last n symbols of the first subframe or first n symbols of the second subframe are used for frequency retuning in the aforementioned embodiment, last 2/n symbols (e.g., 1 symbol) of the first subframe and first n/2 symbols (e.g., 1 symbol) of the second subframe may be set for frequency retuning according to another embodiment. In this manner, symbols in which UL/DL transmission is not performed for frequency retuning may be set through higher layer signaling, but the present invention is not limited thereto.

To prevent the SRS from not being transmitted when SRS transmission is scheduled for the first subband of the first subframe, the SRS may be configured to be transmitted in a symbol other than the last symbol of the first subframe. For example, when last n symbols of the first subframe are set for frequency retuning, the SRS may be transmitted using the last symbol or another symbol from among available symbols other than the last n symbols.

A symbol through which the SRS is transmitted may be set by higher layer signaling. Higher layer signaling may set (e.g., UE-specify) (i) the first and last symbol numbers of each subframe and (ii) the index of the symbol through which the SRS is transmitted. (i) Higher layer signaling for setting the first and last symbol numbers of each subframe: the eNB may UE-specifically set the start and end of each subframe. Such setting may be applied to downlink subframes. In addition, such setting may be used to reduce damage to next transmission of the MTC UE when the MTC UE does not meet requirements for a transient period generated during transmission on/off change between subframes or to avoid setting of a gap for a delay generated when a half-duplex UE changes from DL to UL.

According to one embodiment (e.g., in order to support PUSCH resource allocation method 2), the MTC UE may transmit the SRS such that the eNB can acquire channel information about the UL system bandwidth.

According to one embodiment (e.g., in the case of a PUSCH resource allocation method such as PUSCH resource allocation method 1 or 2), transmission may be restricted for RF retuning (i) when consecutive transmission of an SRS and a PUCCH is scheduled, (ii) when consecutive PUSCH transmission is scheduled (e.g., when a PUSCH is transmitted in the first subframe and a PUSCH is transmitted in the second subframe) or (iii) when consecutive transmission of a PUCCH and a PUSCH is scheduled. A time required for RF retuning may correspond to part of or all symbols corresponding to one subframe, but the present invention is not limited thereto. For example, the time required for RF retuning may correspond to 2 symbol durations.

(2) Transmission of PUSCH and SRS in One Subframe

When SRS transmission is scheduled in a time resource (e.g. subframe) allocated for PUSCH transmission and a frequency resource (e.g. subband for an SRS) set for SRS transmission is not included in the operating bandwidth (e.g. subbands for a PUSCH) of the MTC UE, an RF retuning time for SRS transmission is required, and thus the MTC UE may transmit PUSCH data through symbols for SRS transmission without performing SRS transmission.

Alternatively, the MTC UE may perform SRS transmission and secure the RF retuning time through some initial symbols of a subframe for the PUSCH. Accordingly, PUSCH data corresponding to the secured time (e.g., the number of symbols) may be rate-matched and transmitted.

Alternatively, when the RF retuning time is shorter than a symbol duration, an SRS symbol may be reduced by the time and transmitted.

When SRS transmission is scheduled in a time resource allocated for PUSCH transmission and a frequency resource for which SRS transmission is scheduled is within the operating bandwidth of the MTC UE, the MTC UE may transmit the SRS and rate-match PUSCH data corresponding to SRS transmission symbols.

(3) Transmission of PUCCH and SRS in One Subframe

When SRS transmission is scheduled in a time resource (e.g., subframe or symbol) set for PUCCH transmission and a frequency resource (e.g., subband for a PUCCH) for PUCCH transmission differs from a frequency resource (e.g., subband for an SRS) for SRS transmission, the MTC UE cannot transmit the PUCCH and the SRS through the same symbol. The MTC UE does not transmit the SRS (e.g., transmits the PUCCH only).

(4) SRS Transmission in Subframe and PUSCH Transmission in Next Subframe

When SRS transmission is scheduled in the first subframe of the first subframe, PUSCH transmission is scheduled in the second subband of the second subframe following the first subframe, and the first subband differs from the second subband (e.g., the subbands exceed the operating bandwidth supported by the MTC UE), the MTC UE may secure a time for RF retuning. For example, the MTC UE may set some symbols of the second subframe to the RF retuning time. Accordingly, PUSCH data corresponding to the secured time (e.g., the number of symbols) is rate-matched and transmitted. If the retuning time corresponds to one subframe, the PUSCH may not be transmitted.

Alternatively, the MTC UE may not perform SRS transmission in the first subframe and may transmit the PUSCH in the second subframe. For example, SRS transmission may be set to higher priority than PUSCH transmission.

(i) When periodic SRS transmission is scheduled in subframe #n and PUSCH transmission is scheduled in subframe #(n+1): the MTC UE may prioritize the PUSCH and drop periodic SRS transmission.

(ii) When aperiodic SRS transmission is scheduled in subframe #n and PUSCH transmission including HARQ-ACK and/or an SR (Scheduling Request) is scheduled in subframe #(n+1): the MTC UE may prioritize PUSCH transmission including the HARQ-ACK and/or SR and drop aperiodic SRS transmission.

(iii) When aperiodic SRS transmission is scheduled in subframe #n and PUSCH transmission including periodic CSI reporting is scheduled in subframe #(n+1): the MTC UE may prioritize PUSCH transmission including periodic CSI reporting and drop aperiodic SRS transmission, or vice versa.

(iv) When aperiodic SRS transmission is scheduled in subframe #n and PUSCH transmission including aperiodic CSI reporting is scheduled in subframe #(n+1): the MTC UE may prioritize PUSCH transmission including aperiodic CSI reporting and drop aperiodic SRS transmission, or vice versa.

(v) When aperiodic SRS transmission is scheduled in subframe #n and SPS (semi-persistent scheduling) PUSCH transmission is scheduled in subframe #(n+1): the MTC UE may prioritize aperiodic SRS transmission and drop SPS PUSCH transmission, or vice versa.

(vi) When a frequency resource set for SRS transmission in a previous subframe and a frequency resource allocated for PUSCH transmission are within the operating bandwidth of the MTC UE (e.g., located in the same subband): the MTC UE may perform PUSCH transmission without securing the RF retuning time.

Alternatively, when the RF retuning time is shorter than a symbol duration, the MTC UE may reduce an SRS symbol and perform transmission.

The same method is applicable to a case in which a PUSCH is transmitted in a subframe and an SRS is transmitted in the next subframe.

(5) Consecutive PUSCH Transmission

When a resource allocated for PUSCH transmission in a subframe is separated by more than the operating bandwidth of the MTC UE from a resource allocated for PUSCH transmission in a previous subframe (e.g., when the resources belong to different subbands), the MTC UE may secure a time for RF retuning. For example, when PUSCH transmission is scheduled in the first subband of the first subframe, PUSCH transmission is scheduled in the second subband of the second subframe following the first subframe, and the first subband differs from the second subband (e.g., the subbands exceed the operating bandwidth supported by the MTC UE), the MTC UE may secure the RF retuning time. Here, the PUSCHs may be an identical PUSCH repeatedly transmitted based on frequency hopping or different PUSCHs.

The MTC UE may set last n symbols of the first subframe and/or first n symbols of the second subframe to the RF retuning time. For example, in the case of an identical PUSCH repeatedly transmitted based on frequency hopping, the MTC UE may use the last symbol of the first subframe and the first symbol of the second subframe as the RF retuning time.

Accordingly, PUSCH data of the first subframe and/or the second subframe, which corresponds to the secure time (e.g., the number of symbols) is rate-matched and transmitted.

When a resource allocated for PUSCH transmission in a subframe and a resource allocated for PUSCH transmission in the next subframe are within the operating bandwidth of the MTC UE (e.g., belong to the same subband), the MTC UE may transmit the PUSCHs without securing the RF retuning time.

When PUSCHs are consecutively scheduled, the eNB may allocate the same resources (e.g., resources in the same subband) or allocate resources such that a distance between resources in the frequency domain does not exceed the operating bandwidth supported by the MTC UE, and thus the RF retuning time is not required.

(6) Consecutive Transmission of PUCCH and PUSCH (i) When a resource allocated for PUSCH transmission in a subframe is separated by more than the operating bandwidth of the MTC UE from a resource allocated for PUCCH transmission in a previous subframe (e.g., when the resources belong to different subbands), the MTC UE may secure a time for RF retuning. For example, when PUCCH transmission is scheduled in the first subband of the first subframe, PUSCH transmission is scheduled in the second subband of the second subframe following the first subframe, and the first subband differs from the second subband, the MTC UE may secure the time for RF retuning. For example, the MTC UE transmits a PUCCH in the first subframe and then secures the time for RF retuning through some initial symbols of the second subframe. Accordingly, PUSCH data corresponding to the secured time (e.g., the number of symbols) is rate-matched and transmitted.

(ii) When a resource allocated for PUCCH transmission in a subframe is separated by more than the operating bandwidth of the MTC UE from a resource allocated for PUSCH transmission in a previous subframe (e.g., when the resources belong to different subbands), the MTC UE may secure a time for RF retuning. For example, when PUSCH transmission is scheduled in the first subband of the first subframe, PUCCH transmission is scheduled in the second subband of the second subframe following the first subframe, and the first subband differs from the second subband, the MTC UE may secure the time for RF retuning. For example, the MTC UE secures the time for RF retuning through some last symbols of the first subframe. Accordingly, PUSCH data corresponding to the secured time (e.g., the number of symbols) is rate-matched and transmitted. Thereafter, PUCCH transmission is performed.

For example, when the PUCCH and the PUSCH are consecutively transmitted, the MTC UE secures the time for RF retuning for some initial or last symbols of the subframe corresponding to the PUSCH in order to transmit the PUCCH without loss, and PUSCH data corresponding to the time is rate-matched.

According to one embodiment, the quantity of rate-matched symbols may correspond to all symbols of one subframe, but the present invention is not limited thereto.

When the PUCCH includes HARQ-ACK or an SR, the MTC UE may drop PUSCH transmission for PUCCH transmission or puncture PUSCH symbols for the retuning time and rate-match the PUSCH symbols.

When the PUCCH includes a periodic CSI report, the PUCCH including the periodic CSI report may not be transmitted in subframe #n, subframe #(n−1) and/or subframe #(n+1) in which PUSCH transmission is performed. Here, the periodic CSI report may be piggybacked on the PUSCH and transmitted in subframe #n.

(7) Consecutive Transmission of SRS and PUCCH

When a resource set for PUCCH transmission in a subframe is separated by more than the operating bandwidth of the MTC UE from a frequency resource set for SRS transmission in a previous subframe (e.g., when the resources belong to different subbands), the MTC UE may not perform SRS transmission in the corresponding subframe and may transmit a PUCCH in the next subframe. For example, when SRS transmission is scheduled in the first subband of the first subframe, PUCCH transmission is scheduled in the second subband of the second subframe following the first subframe, and the first subband differs from the second subband, the MTC UE may drop SRS transmission in order to secure a time for RF retuning.

(i) A case in which periodic SRS transmission is scheduled in subframe #n and transmission of a PUCCH for HARQ-ACK, SR or periodic CSI is scheduled in subframe #(n+1): the PUCCH for HARQ-ACK, SR or periodic CSI may be prioritized and periodic SRS transmission may not be performed.

(ii) A case in which aperiodic SRS transmission is scheduled in subframe #n and transmission of a PUCCH for HARQ-ACK or SR is scheduled in subframe #(n+1): the PUCCH for HARQ-ACK or SR may be prioritized and aperiodic SRS transmission may not be performed.

(iii) When a resource set for PUCCH transmission in a subframe is separated by more than the operating bandwidth of the MTC UE from a frequency resource set for SRS transmission in a previous subframe, SRS transmission may be performed whereas PUCCH transmission may not be performed. However, the present invention is not limited thereto.

(iv) A case in which aperiodic SRS transmission is scheduled in subframe #n and transmission of a PUCCH for periodic CSI report is scheduled in subframe #(n+1): aperiodic SRS transmission may be prioritized and transmission of the PUCCH for periodic CSI report may be dropped. However, the present invention is not limited thereto.

Even when a PUCCH is transmitted in a subframe and an SRS is transmitted in the next subframe, the aforementioned method may be applied.

When UL data/signals are transmitted through different subbands in consecutive subframes through a method other than the aforementioned methods (1) to (7), the MTC UE may prioritize UL data/signals preferentially transmitted in the time domain. Specifically, when data/signals transmitted in the first subframe are UL data/signals other than periodic CSI and periodic SRS, the MTC UE may preferentially transmit the data/signals and may not transmit data/signals of the second subframe. For example, when subbands for consecutive UL transmission in subframe #n and subframe #(n+1) differ from each other and (i) when a signal other than the SRS is transmitted in subframe #(n+1), (ii) when frequency retuning delay is set and UL transmission cannot be performed in subframe #(n+1) or (iii) when the MTC UE is aware of information about a channel, which will be transmitted in subframe #(n+1), in subframe #(n−1), the MTC UE prioritizes UL transmission in subframe #n or UL transmission in subframe #(n+1) on the basis of priority of channels transmitted in subframes #n and #(n+1). The time for RF retuning is not set in a subframe in which high-priority UL transmission is performed and may be set only in a subframe in which low-priority UL transmission is performed. If UL transmissions have the same priority, the RF retuning time may be equally divided to consecutive subframes. UL transmission priority may be determined by UL physical channel type or information included in a physical channel. However, the present invention is not limited thereto.

If the UE is not aware of priority, subframe #n may be given priority.

The MTC UE may determine priority according to at least part of the aforementioned methods described in the above-mentioned embodiments.

For example, priority may be set in the order of PRACH transmission>HARQ-ACK or SR transmission (e.g., transmission of a PUCCH for HARQ-ACK or SR>aperiodic CSI report (e.g., transmission of a PUSCH for aperiodic CSI report)>aperiodic SRS transmission>UL data transmission (e.g., transmission of a PUSCH for UL data)>periodic CSI report transmission (e.g., PUCCH)>periodic SRS transmission.

When HARQ-ACK transmission and SR transmission are scheduled in two consecutive subframes (e.g., collide with each other), the MTC UE may prioritize the SR.

For consistency between the network (e.g., eNB) and the UE with respect to priority, the network or the UE may be aware of which transmission will be performed previously (e.g., in subframe #(n−)) in the following cases: (i) in which the MTC UE receives uplink ACK (e.g., DCI), an aperiodic CSI request or an aperiodic SRS request in subframe #(n−1) or subframes prior thereto; (ii) in which UL data/signals that will be transmitted in subframe #(n+1) are a periodically set SPS PUSCH, periodic CSI or a periodic SRS; (iii) in which the MTC UE receives a PDCCH order (e.g., a PDCCH used for the eNB to instruct that a PRACH be transmitted to the UE) in subframe #(n−5) or subframes prior thereto or PRACH transmission is reserved in subframe #(n−1) by a UE-initiated PRACH; and (iv) other cases. For example, cases in which UL data/signals to be transmitted in subframe #(n+1) are known on the basis of UE processing time may be included.

Figure 12:
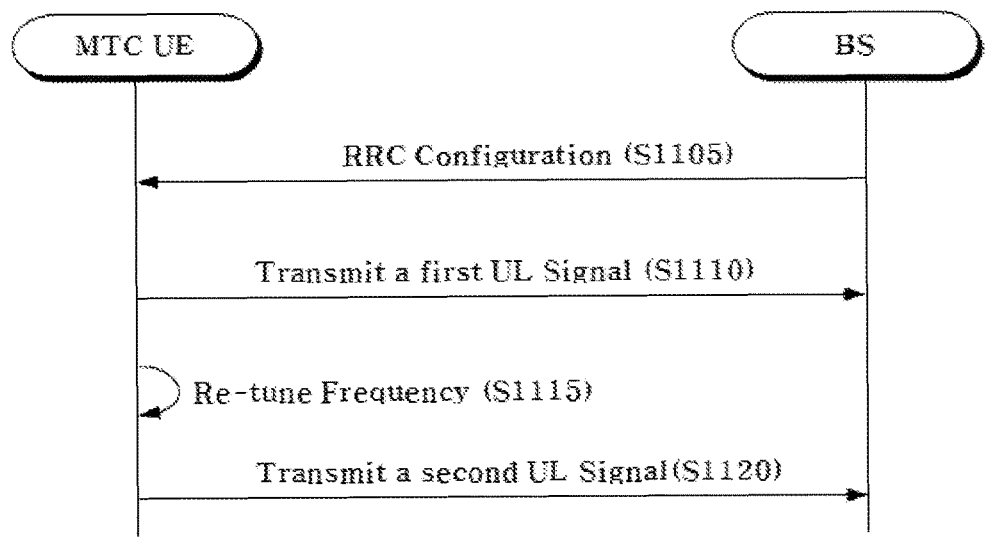
FIG. 12 illustrates a UL signal transmission method of an MTC UE according to an embodiment of the present invention.

FIG. 12 illustrates a method of transmitting a UL signal by an MTC UE according to an embodiment of the present invention.

Referring to FIG. 12, the MTC UE receives a radio resource control (RRC) configuration (S1105). The RRC configuration may include information about subbands through which a PUSCH (physical uplink shared channel) is transmitted. For example, the subbands through which the PUSCH is transmitted may be frequency-hopped on the basis of the RRC configuration.

The MTC UE transmits a first uplink signal through a first subband in a first subframe (S1110).

The MTC UE retunes the frequency from the first subband to the second subband (S1115).

The MTC UE transmits a second uplink signal through a second subband in a second subframe (S1120).

When the first subframe and the second subframe are consecutive, the MTC UE may perform frequency retuning instead of transmission of the first uplink signal or the second uplink signal in at least part of last n symbols of the first subframe and first n symbols of the second subframe.

For example, positions of at least parts of the last n symbols of the first subframe and the first n symbols of the second subframe, which are used for frequency retuning, may be determined according to priority predetermined between the first uplink signal and the second uplink signal.

When the first uplink signal has higher priority than the second uplink signal, frequency retuning may be performed in the first n symbols of the second subframe. When the second uplink signal has higher priority than the first uplink signal, frequency retuning may be performed in the last n symbols of the first subframe.

When the first uplink signal and the second uplink signal have the same priority, symbols used for frequency retuning may be equally distributed in the first subframe and the second subframe.

When the first uplink signal includes an SRS (sounding reference signal) and the second uplink signal includes a PUCCH (physical uplink control channel) or a PUSCH (physical uplink shared channel), symbols used for frequency retuning may include the last symbol of the first subframe and SRS transmission may be dropped.

When the first uplink signal is a PUCCH (physical uplink control channel) and the second uplink signal is a PUSCH (physical uplink shared channel), symbols used for frequency retuning may be set to the first n symbols of the second subframe. When the first uplink signal is a PUSCH and the second uplink signal is a PUCCH, symbols used for frequency retuning may be set to the last n symbols of the first subframe.

When an SRS (sounding reference signal) is configured in the same subframe as a PUCCH (physical uplink control channel) or a PUSCH (physical uplink shared channel) and a subband corresponding to the SRS differs from a subband corresponding to the PUCCH or PUSCH, SRS transmission may be dropped.

According to predetermined priority, the PUCCH (physical uplink control channel) may be prioritized over the PUSCH (physical uplink shared channel) and the PUSCH may be prioritized over the SRS (sounding reference signal).

When the first uplink signal includes a PRACH (physical random access channel), frequency retuning may be performed in the first n symbols of the second subframe. When the second uplink signal includes a PRACH, frequency retuning may be performed in the last n symbols of the first subframe.

Figure 13:
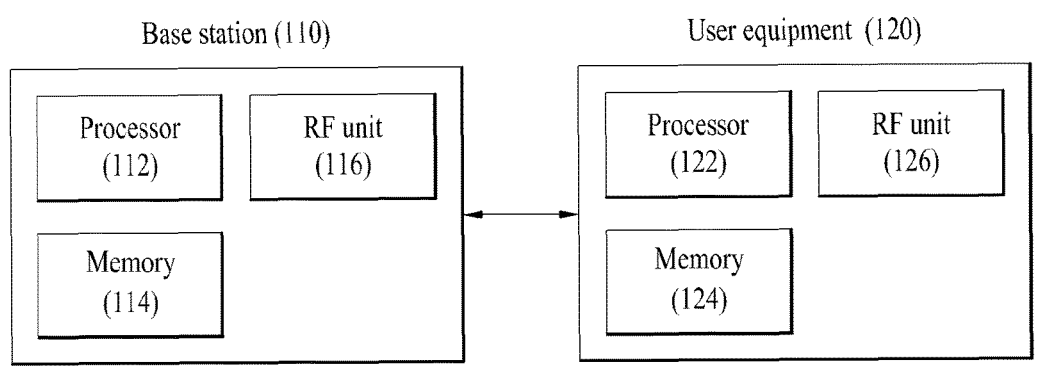
FIG. 13 illustrates a UE and a base station according to an embodiment of the present invention.

FIG. 13 illustrates a BS and a UE applicable to embodiments of the present invention. The BS and the UE illustrated in FIG. 13 may perform operations according to the aforementioned embodiments.

Referring to FIG. 13, a wireless communication system includes a BS 110 and a UE 120. A transmitter is a part of the BS 110 and a receiver is a part of the UE 120 on downlink. The transmitter is a part of the UE 1220 and the receiver is a part of the BS 110 on uplink. The BS 110 includes a processor 112, a memory 114 and a radio frequency (RF) unit 116. The processor 112 may be configured to implement the procedures and/or methods proposed by the present invention. The memory 114 is connected with the processor 112 and stores information related to operations of the processor 112. The RF unit 116 is connected with the processor 112 and transmits and/or receives radio signals. The UE 120 includes a processor 122, a memory 124 and an RF unit 126. The processor 122 may be configured to implement the procedures and/or methods proposed by the present invention. The memory 124 is connected with the processor 122 and stores information related to operations of the processor 122. The RF unit 126 is connected with the processor 122 and transmits and/or receives radio signals. The BS 110 and/or the UE 120 may have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, various operations performed for communication with a user equipment can be performed by a base station or other network nodes than the base station. In this case, "base station" can be replaced by terms such as fixed station, Node B, eNode B (eNB), access point and the like. In addition, "terminal" can be replaced by terms such as mobile station (MS), mobile subscriber station (MSS) and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor. Herein, the memory unit may be located inside or outside of the processor and the memory unit may transmit and receive data to and from the processor by using a wide range of methods that have already been disclosed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

As described above, embodiments of the present invention are applicable to various wireless communication systems including 3GPP based wireless communication systems.

What is claimed is:

1. A method of transmitting an uplink signal by a machine type communication (MTC) user equipment (UE) in a wireless communication system, the method comprising:

transmitting a first uplink signal through a first subband in a first subframe;
retuning a frequency of the MTC UE from the first subband to a second subband; and
transmitting a second uplink signal through the second subband in a second subframe,
wherein in the retuning of the frequency, when the first subframe and the second subframe are consecutive, the MTC UE performs frequency retuning instead of transmission of the first uplink signal or the second uplink signal in at least parts of last n symbols of the first subframe and first n symbols of the second subframe,
wherein positions of the at least parts of the symbols, used for frequency retuning within a range of the last n symbols of the first subframe to the first n symbols of the second subframe, are determined according to a predetermined priority between the first uplink signal and the second uplink signal.

2. The method according to claim 1, wherein, in the retuning of the frequency,
frequency retuning is performed in the first n symbols of the second subframe when the first uplink signal is prioritized over the second uplink signal and
frequency retuning is performed in the last n symbols of the first subframe when the second uplink signal is prioritized over the first uplink signal.

3. The method according to claim 2, wherein, when the first uplink signal and the second uplink signal have a same priority, the at least parts of the symbols in which frequency retuning is performed are equally distributed in the first subframe and the second subframe.

4. The method according to claim 1, wherein, when the first uplink signal includes a sounding reference signal (SRS) and the second uplink signal includes a physical uplink control channel (PUCCH) or a physical uplink shared channel (PUSCH), the at least parts of the symbols in which frequency retuning is performed include a last symbol of the first subframe and transmission of the SRS is dropped.

5. The method according to claim 1,
wherein the at least parts of the symbols in which frequency retuning is performed are set to the first n symbols of the second subframe when the first uplink signal is a physical uplink control channel (PUCCH) and the second uplink signal is a physical uplink shared channel (PUSCH) and
wherein the at least parts of the symbols in which frequency retuning is performed are set to the last n symbols of the first subframe when the first uplink signal is the PUSCH and the second uplink signal is the PUCCH.

6. The method according to claim 1, wherein, when a sounding reference signal (SRS) and one of a physical uplink control channel (PUCCH) or a physical uplink shared channel (PUSCH) are set to a same subframe and a subband of the SRS differs from a subband of the PUCCH or the PUSCH, transmission of the SRS is dropped.

7. The method according to claim 1, wherein a physical uplink control channel (PUCCH) is prioritized over a physical uplink shared channel (PUSCH) and the PUSCH is prioritized over a sounding reference signal (SRS) according to the predetermined priority.

8. The method according to claim 1, further comprising receiving a radio resource control (RRC) configuration about a subband in which a physical uplink shared channel (PUSCH) is transmitted, wherein the subband in which the PUSCH is transmitted is frequency-hopped on the basis of the RRC configuration.

9. The method according to claim 1, wherein, in the retuning of the frequency, frequency retuning is performed in the first n symbols of the second subframe when the first uplink signal includes a physical random access channel (PRACH) and frequency retuning is performed in the last n symbols of the first subframe when the second uplink signal includes the PRACH.

10. A machine type communication (MTC) user equipment (UE) comprising:
a transmitter to transmit a first uplink signal through a first subband in a first subframe and to transmit a second uplink signal through a second subband in a second subframe; and
a processor to retune a frequency of the MTC UE from the first subband to the second subband,
wherein, when the first subframe and the second subframe are consecutive, the processor performs frequency retuning instead of transmission of the first uplink signal or the second uplink signal in at least parts of last n symbols of the first subframe and first n symbols of the second subframe,
wherein positions of the at least parts of the symbols, used for frequency retuning within a range of the last n symbols of the first subframe to the first n symbols of the second subframe, are determined according to a predetermined priority between the first uplink signal and the second uplink signal.

11. The MTC UE according to claim 10,
wherein frequency retuning is performed in the first n symbols of the second subframe when the first uplink signal is prioritized over the second uplink signal and wherein frequency retuning is performed in the last n symbols of the first subframe when the second uplink signal is prioritized over the first uplink signal.

12. The MTC UE according to claim 10, wherein, when the first uplink signal includes a sounding reference signal (SRS) and the second uplink signal includes a physical uplink control channel (PUCCH) or a physical uplink shared channel (PUSCH), the at least parts of symbols in which frequency retuning is performed include a last symbol of the first subframe and transmission of the SRS is dropped.

13. The MTC UE according to claim 10,
wherein the at least parts of symbols in which frequency retuning is performed are set to the first n symbols of the second subframe when the first uplink signal is a physical uplink control channel (PUCCH) and the second uplink signal is a physical uplink shared channel (PUSCH) and
wherein the at least parts of symbols in which frequency retuning is performed are set to the last n symbols of the first subframe when the first uplink signal is a physical uplink shared channel (PUSCH) and the second uplink signal is a physical uplink control channel (PUCCH).

14. The MTC UE according to claim 10, wherein, when a sounding reference signal (SRS) and one of a physical uplink control channel (PUCCH) or a physical uplink shared channel (PUSCH) are set to a same subframe and a subband of the SRS differs from a subband of the PUCCH or the PUSCH, transmission of the SRS is dropped.

15. The MTC UE according to claim 10, wherein a physical uplink control channel (PUCCH) is prioritized over a physical uplink shared channel (PUSCH) and the PUSCH is prioritized over a sounding reference signal (SRS) according to the predetermined priority.

* * * * *